(12) United States Patent
Kurimoto et al.

(10) Patent No.: US 8,310,198 B2
(45) Date of Patent: Nov. 13, 2012

(54) LITHIUM ION SECONDARY CELL CHARGE METHOD AND HYBRID VEHICLE

(75) Inventors: Yasuhide Kurimoto, Toyota (JP); Hitoshi Sakai, Nagoya (JP); Takashi Kuzuya, Nagoya (JP); Masakazu Yokomizo, Ushiku (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 384 days.

(21) Appl. No.: 12/740,434

(22) PCT Filed: Jan. 9, 2009

(86) PCT No.: PCT/JP2009/050208
§ 371 (c)(1),
(2), (4) Date: Apr. 29, 2010

(87) PCT Pub. No.: WO2009/090913
PCT Pub. Date: Jul. 23, 2009

(65) Prior Publication Data
US 2010/0259219 A1    Oct. 14, 2010

(30) Foreign Application Priority Data
Jan. 14, 2008   (JP) ............................... 2008-005116

(51) Int. Cl.
*H02J 7/14* (2006.01)
*H02J 7/00* (2006.01)
(52) U.S. Cl. ........ 320/104; 320/132; 320/134; 320/136; 320/152

(58) Field of Classification Search .................... 320/104
See application file for complete search history.

(56) References Cited

U.S. PATENT DOCUMENTS

| 8,022,673 B2 * | 9/2011 | Nishiyama et al. ........... 320/129 |
| 2005/0266299 A1 | 12/2005 | Nishiyama et al. |
| 2007/0080006 A1 | 4/2007 | Yamaguchi |

FOREIGN PATENT DOCUMENTS

| JP | 6-36803 | 2/1994 |
| JP | 6-325795 | 11/1994 |
| JP | 8-45550 | 2/1996 |
| JP | 9-74611 | 3/1997 |
| JP | 09-074611 | * 3/1997 |
| JP | 2004-171864 | 6/2004 |
| JP | 2005-140080 | 6/2005 |

* cited by examiner

*Primary Examiner* — Edward Tso
*Assistant Examiner* — Ahmed Omar
(74) *Attorney, Agent, or Firm* — Finnegan, Henderson, Farabow, Garrett & Dunner, LLP

(57) ABSTRACT

Provided is a lithium ion secondary cell charge method including: a step S1 which judges whether a physical amount value corresponding to an accumulation amount of a lithium ion secondary cell is lowered to a first predetermined value; a step S2 which judges whether a hybrid vehicle is in a travel stop state; and charge steps S5 to SA which divide a charge period K into two or more divided charge periods KC1, KC2 and a non-charge period KR between the divided charge periods, so that charge is performed during the divided charge periods KC1, KC2 while the hybrid vehicle is in the travel stop state and charge stop or discharge is performed during the non-charge period KR, wherein each of the divided charge periods KC1, KC2 is not shorter than 40 seconds.

12 Claims, 16 Drawing Sheets

LITHIUM ION SECONDARY CELL CHARGE METHOD AND HYBRID VEHICLE

CROSS-REFERENCE TO RELATED APPLICATIONS

This application is a national phase application of International Application No. PCT/JP2009/050208, filed Jan. 9, 2009, and claims the priority of Japanese Application No. 2008-005116, filed Jan. 14, 2008, the contents of both of which are incorporated herein by reference.

TECHNICAL FIELD

The present invention relates to a method for charging a lithium ion secondary cell and a hybrid electric vehicle.

BACKGROUND ART

A lithium ion secondary cell has attracted attention as a power source for a portable device or a power source for an electric vehicle, a hybrid electric vehicle, and the like. At present, various methods for charging the lithium ion secondary cell are proposed (for example, see Patent Literatures 1 to 3).

CITATION LIST

Patent Literature

Patent Literature 1: JP06-36803A
Patent Literature 2: JP06-325795A
Patent Literature 3: JP2004-171864A Patent Literature 1 discloses a method for charging using such a pulsed current method in which energization and stop of the energization are repeated. Specifically, energization for 0.1 to 10 milliseconds and stop of the energization for 0.5 to 100 milliseconds are repeated, whereby a lithium ion secondary cell is charged. According to this configuration, the growth of dendrite can be prevented, and charging can be repeated a large number of times without the occurrence of charging failure.

Patent Literature 2 discloses a method for charging comprising charging with a constant current until the cell voltage reaches a full charge voltage, and after the cell voltage reaches the full charge voltage, performing such intermittent charging in which stop of charging and charging with a constant current are repeated. This configuration can prevent a cell from being damaged by overcharge and can perform charging neither too much nor too little to the full charge voltage.

Patent Literature 3 discloses such a method for intermittently charging in which energization and suspension of the energization are repeated. Specifically, a lithium ion secondary cell is charged at a charge rate of 20 C while charging for 10 seconds and suspension for 0.8 seconds are repeated. This configuration can increase the effective capacity of the cell.

SUMMARY OF INVENTION

Technical Problem

In a hybrid electric vehicle, when the storage amount of a lithium ion secondary cell, which is used as a power source for driving and mounted therein, is lowered to a first predetermined value (for example, the storage amount corresponding to SOC 30%), the lithium ion secondary cell may be charged until the storage amount of the lithium ion secondary cell reaches a second predetermined value (for example, the storage amount corresponding to SOC 60%) while the hybrid electric vehicle stops running.

However, when the lithium ion secondary cell is rapidly and continuously charged while the hybrid electric vehicle stops running, metal Li may be deposited on a surface of a negative electrode. It is considered that this is because Li ions that are not incorporated into the negative electrode are deposited as metal Li on the surface of the negative electrode due to the diffusion control of Li ions on the negative electrode surface. Thus, repetition of the rapid and continuous charging may cause the deposition of a large amount of metal Li. Once metal Li is deposited on the negative electrode surface, it is difficult for the metal Li to contribute to charge transfer again as Li ions, and therefore, that may result in a significant deterioration of a cell (significant reduction of the electrical capacity).

In the method for charging disclosed in the Patent Literature 2, as described above, charging is continuously performed with a constant current until the cell voltage reaches a full charge voltage. Thus, when this method for charging is used in the above case in which a lithium ion secondary cell is charged while a hybrid electric vehicle stops running, it is considered that metal Li is deposited on the negative electrode surface for each charging to result in early deterioration of a cell (significant reduction of the electrical capacity).

As described in the Patent Literatures 1 and 3, when short-term charging and suspension of charging are alternatively repeated, idling of a hybrid electric vehicle becomes unstable and that may lose the comfort of riding the hybrid electric vehicle to make a driver and fellow passengers uncomfortable. Thus, the methods for charging disclosed in the Patent Literatures 1 and 3 are not favorable.

The present invention has been made in view of the above situations, and it is an object of the present invention to provide a method for charging a lithium ion secondary cell mounted in a hybrid electric vehicle, which is capable of suppressing the deposition of metal Li on a surface of a negative electrode to suppress the reduction of the electrical capacity, and preventing the loss the comfort of riding the hybrid electric vehicle, and a hybrid electric vehicle.

Solution to Problem

To solve the above problems, there is provided a method for charging a lithium ion secondary cell, which is used as a power source for driving and mounted in a hybrid electric vehicle, the method comprising the steps of: determining whether a value of a physical quantity corresponding to a storage amount of the lithium ion secondary cell has lowered to a first predetermined value; determining whether the hybrid electric vehicle is in a travel stop state; and when it is determined that the value of the physical quantity corresponding to the storage amount of the lithium ion secondary cell has lowered to the first predetermined value and in addition when it is determined that the hybrid electric vehicle is in the travel stop state, charging the lithium ion secondary cell until the value of the physical quantity corresponding to the storage amount of the lithium ion secondary cell reaches a second predetermined value while the hybrid electric vehicle stops running, wherein in the step of charging, a period during which the lithium ion secondary cell is charged is split into two or more split charging periods and non-charging periods provided between the split charging periods, and charging is performed in the split charging period and at least one of suspension of charging and discharging is performed in the non-charging period, and the length of each of the split charging periods is not less than 40 seconds.

The present invention relates to a method for charging a lithium ion secondary cell used as a power source for driving and mounted in a hybrid electric vehicle. In this method, when a value of a physical quantity corresponding to a storage amount of the lithium ion secondary cell is lowered to a first predetermined value, the lithium ion secondary cell is charged until the value of the physical quantity corresponding to the storage amount of the lithium ion secondary cell reaches a second predetermined value while the hybrid electric vehicle stops running.

In the method for charging of the present invention, a charging period during which charging is performed until the value of the physical quantity corresponding to the storage amount lowered to the first predetermined value reaches the second predetermined value is split into two or more split charging periods and non-charging periods provided between the split charging periods. In the split charging periods, charging is performed, and in the non-charging period, at least one of suspension of charging and discharging is performed. At least one of suspension of charging and discharging is performed while charging from the first predetermined value to the second predetermined value, whereby the deposition of metal Li on a negative electrode surface can be suppressed. It is considered that this is because when at least one of suspension of charging and discharging is performed, Li ions retained on an interface between an electrolytic solution and a negative electrode due to the diffusion control can be diffused. Thus, according to the method for charging of the present invention, the reduction of the electrical capacity can be suppressed.

In the method for charging of the present invention, the length of each split charging period is not less than 40 seconds. When a single split charging period is long in this way, the idling of the hybrid electric vehicle can be stabilized and therefore, the comfort of riding the hybrid electric vehicle is not lost.

"The physical quantity corresponding to the storage amount" means the storage amount and the physical quantity having one-to-one correspondence to the storage amount and includes SOC (State of Charge) and a cell voltage (a voltage between terminals).

The first predetermined value may include the storage amount corresponding to SOC 30% and a value of the voltage between terminals of a cell in this storage state. The second predetermined value may include the storage amount corresponding to SOC 60% and a value of the voltage between terminals of a cell in this storage state.

"At least one of suspension of charging and discharging is performed in the non-charging period" means that charging may be suspended over the entire non-charging period, or discharging may be performed over the entire non-charging period. The non-charging period during which charging is suspended and the non-charging period during which discharging is performed may be mixed. Alternatively, suspension of charging and discharging may be performed in one non-charging period.

In the above method for charging the lithium ion secondary cell, preferably, the non-charging period is a charging suspension period during which charging of the lithium ion secondary cell is suspended, and a ratio tr/tc between the length tc of each of the split charging periods and the length tr of the charging suspension period immediately after the split charging period is not less than 0.14 and not more than 0.9.

In the method for charging of the present invention, the non-charging period is the charging suspension period. In other words, charging is suspended over the entire non-charging period. Thus, split charging is separately performed so that suspension is interposed in between until the value of the physical quantity corresponding to the storage amount reaches the second predetermined value.

When the charging suspension period is too short relative to the split charging period, Li ions retained on the interface between the electrolytic solution and the negative electrode due to the diffusion control cannot be satisfactorily diffused, whereby the deposition of metal Li on the negative electrode surface cannot be satisfactorily suppressed.

Meanwhile, in the method for charging of the present invention, a ratio tr/tc between the length tc of each split charging period and the length tr of the charging suspension period immediately after the split charging period is not less than 0.14. This configuration can suppress the deposition of metal Li on a negative electrode surface.

Meanwhile, when the charging suspension period is long, the deposition of metal Li on a negative electrode surface can be suppressed; however, when the charging suspension period is too long, the value of the physical quantity corresponding to the storage amount of the lithium ion secondary cell cannot be restored to the second predetermined value while the hybrid electric vehicle stops running. It is sufficient for the charging suspension period to have a length allowing the diffusion of Li ions retained on the interface between the electrolytic solution and the negative electrode due to the diffusion control, and there is no use in suspending charging over the relevant period.

On the other hand, in the method for charging of the present invention, the ratio tr/tc is not more than 0.9. This configuration can rapidly and appropriately return the value of the physical quantity, corresponding to the storage amount of the lithium ion secondary cell, to the second predetermined value without spending useless charging suspension time.

In the above method for charging the lithium ion secondary cell, preferably, the non-charging period is a discharging period during which the lithium ion secondary cell is discharged.

In the non-charging period, discharging can diffuse Li ions more rapidly than in the case of suspending charging. Thus, in the method for charging of the present invention, the non-charging period is the discharging period. Namely, discharging is performed over the entire non-charging period. Thus, split charging is separately performed so that discharging is interposed in between until the value of the physical quantity corresponding to the storage amount reaches the second predetermined value. According to this configuration, the lithium ion secondary cell with the value of the physical quantity lowered to the first predetermined value can rapidly be charged until the value of the physical quantity reaches the second predetermined value.

In the above method for charging the lithium ion secondary cell, preferably, each of the non-charging periods is a charging suspension period during which charging of the lithium ion secondary cell is suspended and a discharging period during which the lithium ion secondary cell is discharged.

In each non-charging period, when suspension of charging and discharging are performed, Li ions retained on a negative electrode surface can be satisfactorily diffused. Thus, in the method for charging of the present invention, each non-charging period includes the charging suspension period and the discharging period. Namely, in each non-charging period, suspension of charging and discharging are performed. Thus, split charging is separately performed so that suspension of charging and discharging are interposed in between until the value of the physical quantity corresponding to the storage amount reaches the second predetermined value. According to this configuration, the reduction of the electrical capacity can be further suppressed.

The above method for charging the lithium ion secondary cell, preferably, further comprises the steps of: determining whether an engine mounted in the hybrid electric vehicle is in an operating state; and instructing start of the operation of the engine when it is determined that the engine is not operating, wherein in the step of charging, in such a state that a generator mounted in the hybrid electric vehicle is being driven by the operation of the engine, an electric power generated by the generator is supplied to the lithium ion secondary cell to charge the lithium ion secondary cell.

In the method for charging of the present invention, it is determined whether the engine mounted in the hybrid electric vehicle is in an operating state. When it is determined that the engine is not operating, the start of the operation of the engine is instructed. According to this configuration, the electrical power generated by the generator mounted in the hybrid electric vehicle can be supplied to the lithium ion secondary cell in such a state that the generator is being driven by the operation of the engine. Thus, the lithium ion secondary cell in which the value of the physical quantity corresponding to the storage amount is lowered to the first predetermined value can appropriately be charged until the value of the physical quantity reaches the second predetermined value.

In the above method for charging the lithium ion secondary cell, preferably, defining 1 C as a current value allowing a theoretical electrical capacity to be charged for 1 hour, that can be theoretically stored at maximum in a positive-electrode active material contained in the lithium ion secondary cell, the lithium ion secondary cell is charged with a current having a magnitude of not less than 2 C in the step of charging.

In the method for charging of the present invention, the lithium ion secondary cell is charged with a current having a magnitude of not less than 2 C. When the lithium ion secondary cell is charged with such a large current, the lithium ion secondary cell in which the value of the physical quantity corresponding to the storage amount is lowered to the first predetermined value can be charged in a shorter time so that the value of the physical quantity reaches the second predetermined value.

When the charging current is large, the charging time can be shortened as described above. However, meanwhile, Li ions are easily retained on the interface between the electrolytic solution and the negative electrode due to the diffusion control of Li ions. However, in the method for charging of the present invention, as described above, since at least one of suspension of charging and discharging is performed while charging from the first predetermined value to the second predetermined value, the Li ions retained on the interface between the electrolytic solution and the negative electrode can be diffused, whereby the deposition of metal Li on a negative electrode surface can be suppressed.

It is preferable in that as the charging current becomes larger, the lithium ion secondary cell can be charged so that the value of the physical quantity reaches the second predetermined value in a shorter time. However, when the charging current is too large, the deterioration of the cell, a charging system, and so on is accelerated. Thus, it is preferable that the magnitude of the charging current is not less than 2 C and not more than 10 C, for example.

To solve the above problems, there is provided a hybrid electric vehicle comprising: a lithium ion secondary cell which is used as a power source for driving and mounted in the hybrid electric vehicle; a first determination device which determines whether a value of a physical quantity corresponding to a storage amount of the lithium ion secondary cell has lowered to a first predetermined value; a stop state determination device which determines whether the hybrid electric vehicle is in a travel stop state; and a charging control device which, when it is determined that the value of the physical quantity corresponding to the storage amount of the lithium ion secondary cell has lowered to the first predetermined value and in addition when it is determined that the hybrid electric vehicle is in the travel stop state, controls charging of the lithium ion secondary cell until the value of the physical quantity corresponding to the storage amount of the lithium ion secondary cell reaches a second predetermined value while the hybrid electric vehicle stops running, wherein the charging control device splits a period during which the lithium ion secondary cell is charged into two or more split charging periods and non-charging periods provided between the split charging periods, and performs charging in the split charging period and performs at least one of suspension of charging and discharging in the non-charging period, and the length of each of the split charging periods is not less than 40 seconds.

When the value of the physical quantity corresponding to the storage amount of the lithium ion secondary cell, used as a power source for driving and mounted in the hybrid electric vehicle of the present invention, is lowered to the first predetermined value, the charge control device of the hybrid electric vehicle controls charging of the lithium ion secondary cell until the value of the physical quantity corresponding to the storage amount of the lithium ion secondary cell reaches the second predetermined value while the hybrid electric vehicle stops running. The charging control device splits a period during which charging is performed until the value of the physical quantity corresponding to the storage amount lowered to the first predetermined value reaches the second predetermined value, into two or more split charging periods and the non-charging periods provided between the split charging periods. The charging control device further performs charging in the split charging period and performs at least one of suspension of charging and discharging in the non-charging period.

As described above, when at least one of suspension of charging and discharging is performed during the charging period from the first predetermined value to the second predetermined value, the deposition of metal Li on a negative electrode surface can be suppressed. It is considered that this is because when at least one of suspension of charging and discharging is performed, it is possible to diffuse Li ions retained on the interface between the electrolytic solution and the negative electrode due to the diffusion control. Thus, in the hybrid electric vehicle of the present invention, it is possible to suppress the reduction of the electrical capacity of the lithium ion secondary cell which is used as a power source for driving and mounted therein.

Further, in the hybrid electric vehicle of the present invention, the charging control device sets the length of each split charging period to not less than 40 seconds. When a single split charging period is long in this way, the idling of the hybrid electric vehicle can be stabilized, and therefore, the comfort of riding the hybrid electric vehicle is not lost.

Further, in the above hybrid electric vehicle, preferably, the charging control device is configured so that the non-charging period is a charging suspension period during which charging of the lithium ion secondary cell is suspended and that a ratio tr/tc between the length tc of each of the split charging periods and the length tr of the charging suspension period immediately after the split charging period is not less than 0.14 and not more than 0.9, the charging control device controls charging of the lithium ion secondary cell.

In the hybrid electric vehicle of the present invention, the non-charging period is the charging suspension period in the charging control device. In other words, charging is suspended over the entire non-charging period. Thus, split charging is separately performed so that suspension is interposed in between until the value of the physical quantity corresponding to the storage amount reached the second predetermined value.

A ratio tr/tc between the length tc of each split charging period and the length tr of the charging suspension period immediately after the split charging period is not less than 0.14 and not more than 0.9. The configuration that the ratio tr/tc is not less than 0.14 can suppress the deposition of metal Li on the negative electrode surface. Further, the configuration that the ration tr/tc is not more than 0.9 can rapidly and appropriately return the value of the physical quantity corresponding to the storage amount of the lithium ion secondary cell to the second predetermined value without spending useless charging suspension time.

Further, in the above hybrid electric vehicle, preferably, the charging control device is configured so that the non-charging period is a discharging period during which the lithium ion secondary cell is discharged.

In the non-charging period, discharging can diffuse Li ions more rapidly than in the case of suspending charging. Thus, in the hybrid electric vehicle of the present invention, the non-charging period is the discharging period in the charging control device. Namely, discharging is performed over the entire non-charging period. Thus, split charging is separately performed so that discharging is interposed in between until the value of the physical quantity corresponding to the storage amount reaches the second predetermined value. According to this configuration, the lithium ion secondary cell with the value of the physical quantity corresponding to the storage amount lowered to the first predetermined value can rapidly be charged until the value of the physical quantity reached the second predetermined value.

Further, in the above hybrid electric vehicle, preferably, the charging control device is configured so that each of the non-charging periods is a charging suspension period during which charging of the lithium ion secondary cell is suspended and a discharging period during which the lithium ion secondary cell is discharged.

In each non-charging period, when suspension of charging and discharging are performed, Li ions retained on a negative electrode surface can be satisfactorily diffused. Thus, in the hybrid electric vehicle of the present invention, each non-charging period includes the charging suspension period and the discharging period in the charging control device. Namely, in each non-charging period, suspension of charging and discharging are performed. Thus, split charging is separately performed so that suspension of charging and discharging are interposed in between until the value of the physical quantity corresponding to the storage amount reaches the second predetermined value. According to this configuration, the reduction of the electrical capacity can be further suppressed.

Further, the above hybrid electric vehicle, preferably, further comprises: an engine operation determination device which determines whether an engine mounted in the hybrid electric vehicle is operating; and an engine operation instruction device which instructs start of the operation of the engine when it is determined that the engine is not operating, wherein the charging control device performs control so that, in such a state that a generator mounted in the hybrid electric vehicle is being driven by the operation of the engine, an electric power generated by the generator is supplied to the lithium ion secondary cell to charge the lithium ion secondary cell.

In the hybrid electric vehicle of the present invention, it is determined whether the engine mounted in the hybrid electric vehicle is in an operating state. When it is determined that the engine is not operating, the start of the operation of the engine is instructed. According to this configuration, the electrical power generated by the generator mounted in the hybrid electric vehicle can be supplied to the lithium ion secondary cell in such a state that the generator is being driven by the operation of the engine. Thus, the lithium ion secondary cell in which the value of the physical quantity corresponding to the storage amount is lowered to the first predetermined value can appropriately be charged until the value of the physical quantity reached the second predetermined value.

Further, in the above hybrid electric vehicle, preferably, defining 1 C as a current value allowing a theoretical electrical capacity to be charged for 1 hour, that can be theoretically stored at maximum in a positive-electrode active material contained in the lithium ion secondary cell, the charging control device performs control so that the lithium ion secondary cell is charged with a current having a magnitude of not less than 2 C.

In the hybrid electric vehicle of the present invention, the lithium ion secondary cell is charged with a current having a magnitude of not less than 2 C. When the lithium ion secondary cell is charged with such a large current, the lithium ion secondary cell in which the value of the physical quantity corresponding to the storage amount is lowered to the first predetermined value can be charged in a shorter time so that the value of the physical quantity reaches the second predetermined value. Furthermore, as described above, since at least one of suspension of charging and discharging is performed while charging from the first predetermined value to the second predetermined value, the Li ions retained on the interface between the electrolytic solution and the negative electrode can be diffused, whereby the deposition of metal Li on a negative electrode surface can be suppressed.

It is preferable in that as the charging current becomes larger, the lithium ion secondary cell can be charged so that the value of the physical quantity reached the second predetermined value in a shorter time. However, when the charging current is too large, the deterioration of the cell, a charging system, and so on is accelerated. Thus, it is preferable that the magnitude of the charging current is not less than 2 C and not more than 10 C, for example.

REFERENCE SIGNS LIST

Figure 1:
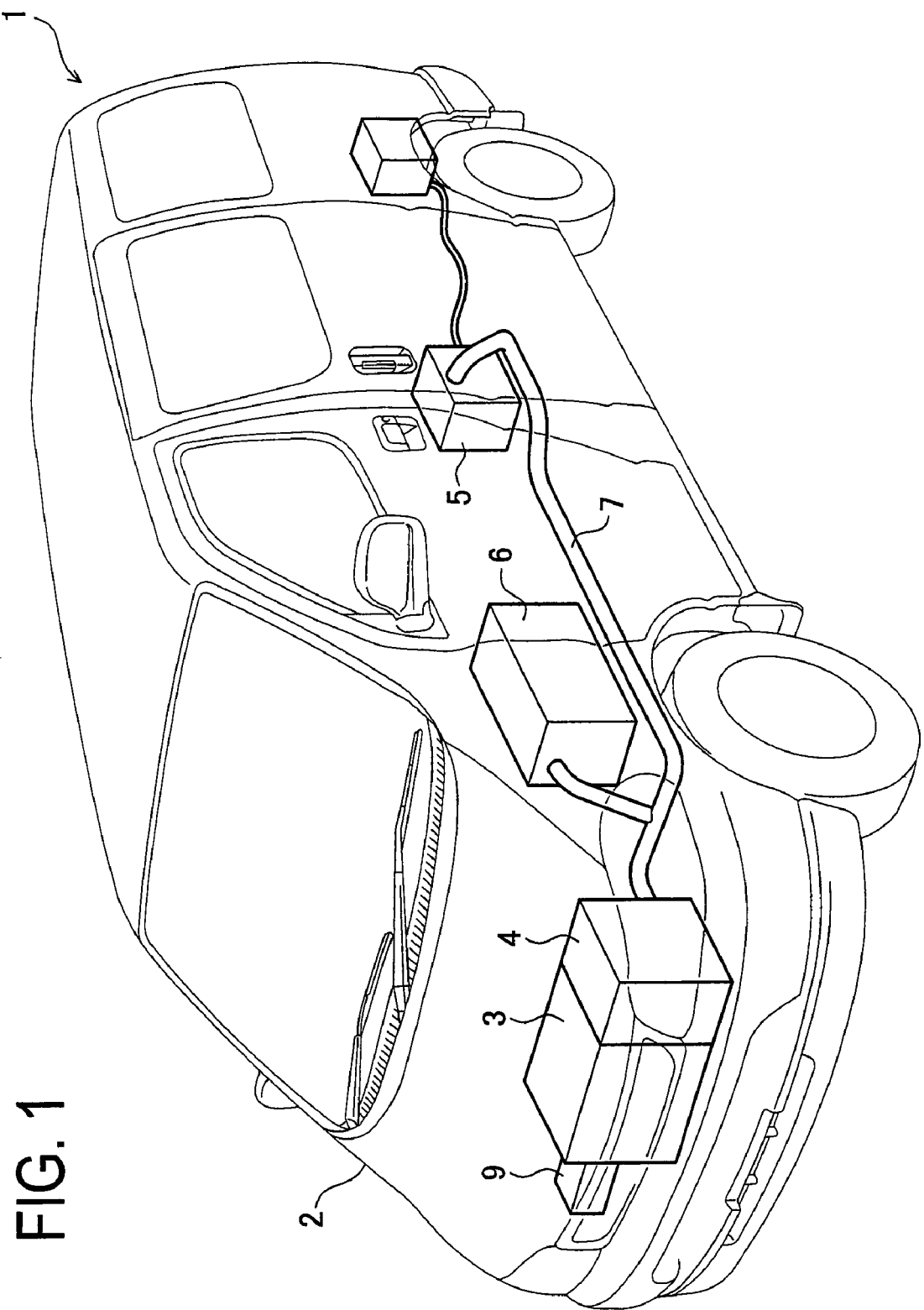
FIG. 1 is a schematic view of a hybrid electric vehicle in embodiments 1 to 17.

1 Hybrid electric vehicle
3 Engine
6 Cell system
9 Generator (Alternator)
10 Assembled cell
30 Cell controller (a first determination device, a stop state determination device, a charging control device, an engine operation determination device, an engine operation instruction device)
40 Voltage detector
50 Current detector
100 Lithium ion secondary cell
153 Positive-electrode active material
KC1 First split charging period
KC2 Second split charging period
KR Charging suspension period (non-charging period)

DESCRIPTION OF EMBODIMENTS

Embodiment 1

Next, an embodiment 1 of the present invention will be described with reference to the drawings.

A hybrid electric vehicle 1 according to the embodiment 1, as shown in FIG. 1, includes a vehicle body 2, an engine 3, a front motor 4, a rear motor 5, a cell system 6, a cable 7, and a generator 9 and is driven by the combined use of the engine 3, the front motor 4, and the rear motor 5. Specifically, in the hybrid electric vehicle 1, the cell system 6 is used as a power source for driving the front motor 4 and the rear motor 5, and the hybrid electric vehicle 1 is configured by well-known means in such a manner as to run using the engine 3, the front motor 4, and the rear motor 5.

Figure 2:
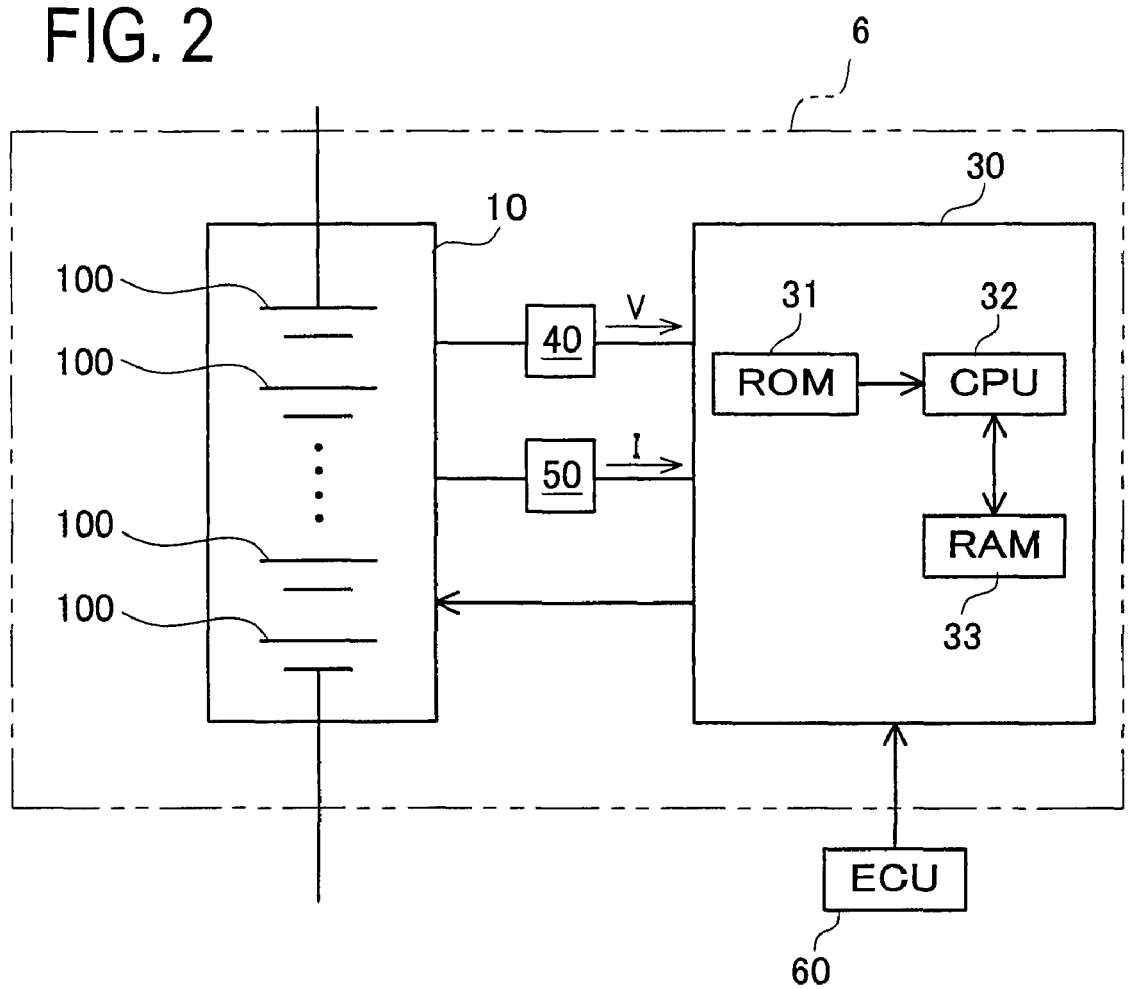
FIG. 2 is a schematic view of a cell system in the embodiments 1 to 17.

The cell system 6 is mounted in the vehicle body 2 of the hybrid electric vehicle 1 and connected to the front motor 4 and the rear motor 5 via the cable 7. As shown in FIG. 2, the cell system 6 comprises an assembled cell 10 including a plurality of lithium ion secondary cells 100 (electric cells) electrically connected to each other in series, a voltage detector 40, a current detector 50, and a cell controller 30. The cell controller 30 includes a ROM 31, a CPU 32, and a RAM 33 and the like.

The voltage detector 40 detects a voltage between terminals V of each of the lithium ion secondary cells 100. Meanwhile, the current detector 50 detects a current value I of the current flowing through the lithium ion secondary cells 100 constituting the assembled cell 10.

The cell controller 30 calculates a storage amount of the lithium ion secondary cell 100 based on the voltage V between terminals detected by the voltage detector 40 (specifically, the average value of the lithium ion secondary cells 100 constituting the assembled cell 10) to estimate an SOC (State of Charge) of the lithium ion secondary cell 100 from the calculated storage amount.

Further, the cell controller 30 determines whether the storage amount of the lithium ion secondary cell 100 is lowered to a first predetermined value (the storage amount corresponding to SOC 30% in the embodiment 1). In the embodiment 1, whether the estimated SOC is lowered to 30% is determined.

The cell controller 30 determines whether the hybrid electric vehicle 1 is in a stop state. Specifically, the cell controller 30 determines whether the hybrid electric vehicle 1 is in the stop state based on a signal transmitted from an ECU 60. In the ECU 60, when the cell system 6 is in an activated state, and when a shift position is an "N position" or a "P position", it is determined that the hybrid electric vehicle 1 is in the stop state, and the ECU 60 transmits a stop state signal, indicating that the hybrid electric vehicle 1 is in the stop state, to the cell controller 30. When the shift position is a "D position", and when an accelerator is not depressed and thus the speed of the hybrid electric vehicle 1 is "0", it is determined that the hybrid electric vehicle 1 is in the stop state, and the ECU 60 transmits the stop state signal to the cell controller 30. When the cell controller 30 detects the stop state signal, it is determined that the hybrid electric vehicle 1 is in the stop state.

The cell controller 30 determines whether the engine 3 mounted in the hybrid electric vehicle 1 is operating. Specifically, the cell controller 30 determines whether the engine 3 is operating based on the signal transmitted from the ECU 60. In the ECU 60, when the number of rotations of the engine 3 is not "0", it is determined that the engine 3 is operating, and an operating state signal indicating that the engine 3 is operating is transmitted to the cell controller 30. When the cell controller 30 detects the operating state signal, it is determined that the engine 3 is operating.

When the cell controller 30 determines that the engine 3 is not operating, the start of the operation of the engine 3 is instructed. This instruction allows the engine 3 to be in the operating state (idling state), and therefore the generator 9 (alternator) is driven.

When the cell controller 30 determines that the storage amount of the lithium ion secondary cell 100 is lowered to the first predetermined value (the estimated SOC is lowered to 30%), and, in addition, when the cell controller 30 determines that the hybrid electric vehicle 1 is in a travel stop state, the cell controller 30 performs control so that the lithium ion secondary cell 100 is charged until the storage amount of the lithium ion secondary cell 100 reaches the second predetermined value while the hybrid electric vehicle 1 is stopped. Specifically, in such a state in which the generator 9 is being driven by the operation of the engine 3, the electric power generated by the generator 9 is supplied to the lithium ion secondary cells 100 constituting the assembled cell 10.

In the embodiment 1, the second predetermined value is the storage amount corresponding to SOC 60%. Thus, the cell controller 30 continues charging of the lithium ion secondary cell 100 until the estimated SOC reaches 60%. Since a theoretical electrical capacity of the lithium ion secondary cell 100 is 5 Ah, the storage amount corresponding to SOC 100% is 5 Ah.

Further, in the embodiment 1, the cell controller 30 corresponds to a first determination device, a stop state determination device, an engine operation determination device, an engine operation instruction device, and a charging control device.

Figure 3:
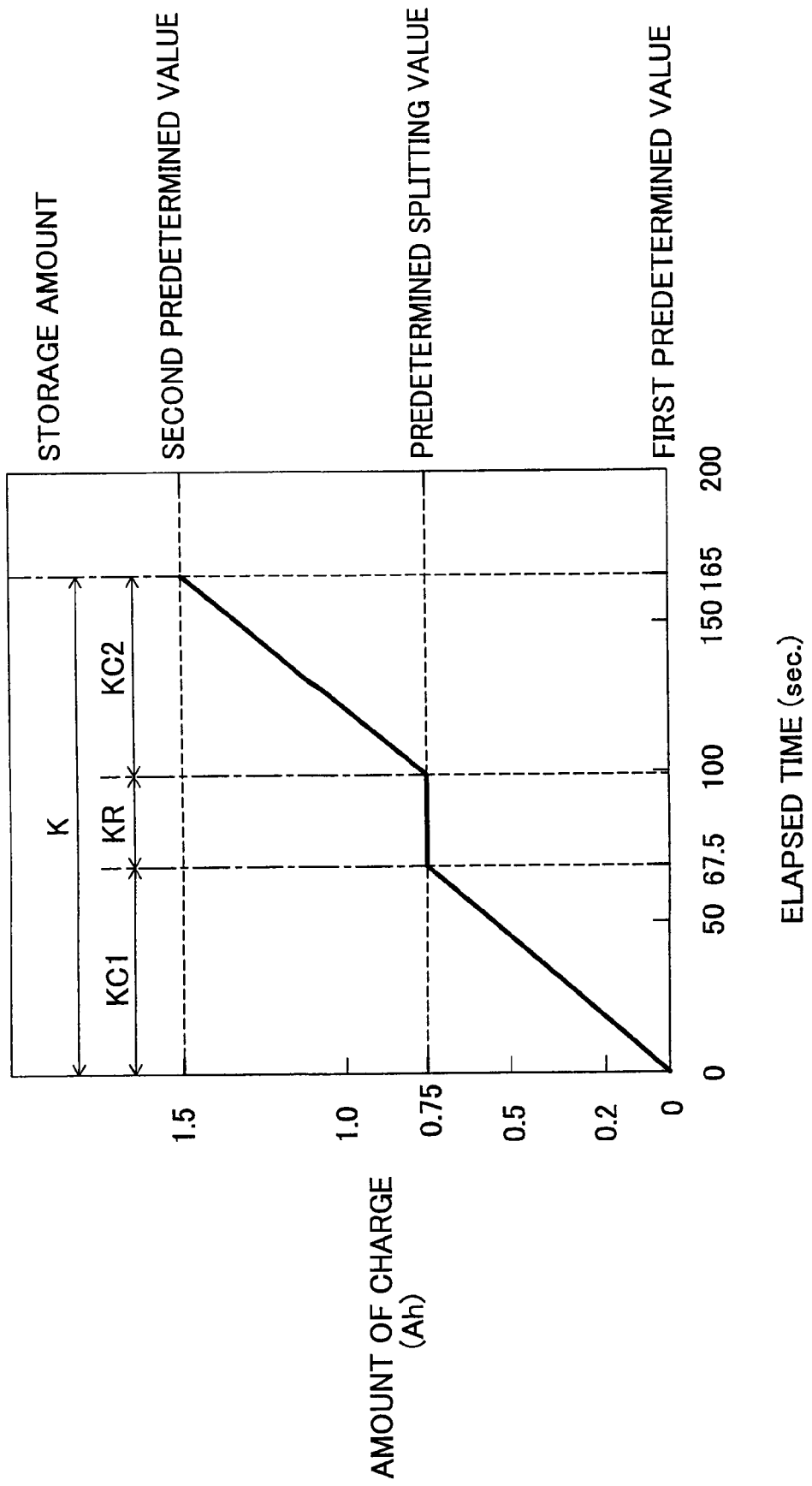
FIG. 3 is an explanatory chart showing a charging method in the embodiment 1.

The cell controller 30 splits a charging period until the storage amount of the lithium ion secondary cell 100 reaches the second predetermined value into two or more split charging periods and non-charging periods provided between the split charging periods. Charging is performed during the split charging period, and charging is suspended during the non-charging period. In the embodiment 1, as shown in FIG. 3, a charging period K is split into two split charging periods (a first split charging period KC1 and a second split charging period KC2) and a non-charging period (a charging suspension period KR) between these split charging periods. In FIG. 3, charging and suspension of charging are repeated in order of "charging, suspension, and charging", whereby the storage amount is restored to the second predetermined value.

The charging suspension period KR is provided in the charging period K from the first predetermined value to the second predetermined value, and consequently the deposition of metal Li on a negative electrode surface can be suppressed. It is considered that this is because the suspension of charging enables Li ions, retained on the interface between the electrolytic solution and the negative electrode due to the diffusion control, to be diffused in the lithium ion secondary cell 100. This configuration can prevent the reduction of the electrical capacity caused by the deposition of metal Li.

Although the length tc of the split charging period may be not less than 40 seconds, in the embodiment 1, the length tc of the first split charging period KC1 is 67.5 seconds, and the length tc of the second split charging period KC2 is also 67.5 seconds. In this way the length of the split charging period is increased, whereby the idling of the hybrid electric vehicle 1 can be stabilized. Therefore, the comfort of riding the hybrid electric vehicle is not lost, and thus a driver and fellow passengers do not feel uncomfortable.

It is preferable that the length tr of the charging suspension period is set so that a ratio tr/tc between the length tc of each split charging period and the length tr of the charging suspension period immediately after the split charging period is not less than 0.14 and not more than 0.9. In the embodiment 1, the length tr of the charging suspension period KR is 30 seconds, and thus tr/tc=30/67.5=0.44. The number of the split charging periods, the length tc of the split charging period, and the length tr of the charging suspension period are previously stored in the ROM 31 of the cell controller 30.

The magnitude of the charging current is preferably set to not less than 2 C and not more than 10 C. In the embodiment 1, in the split charging period KC1 and the second split charging period KC2, the charging current is a constant current of the magnitude of 8 C (40 A). Charging with a large current can realize that the lithium ion secondary cell 100 whose storage amount is lowered to the first predetermined value can be charged so that the storage amount reaches the second predetermined value in a short time. In the embodiment 1, the storage amount of the lithium ion secondary cell 100, in which the SOC is lowered to 30%, can be restored to the storage amount corresponding to SOC 60% in 165 seconds (=67.5+30+67.5).

Figure 4:
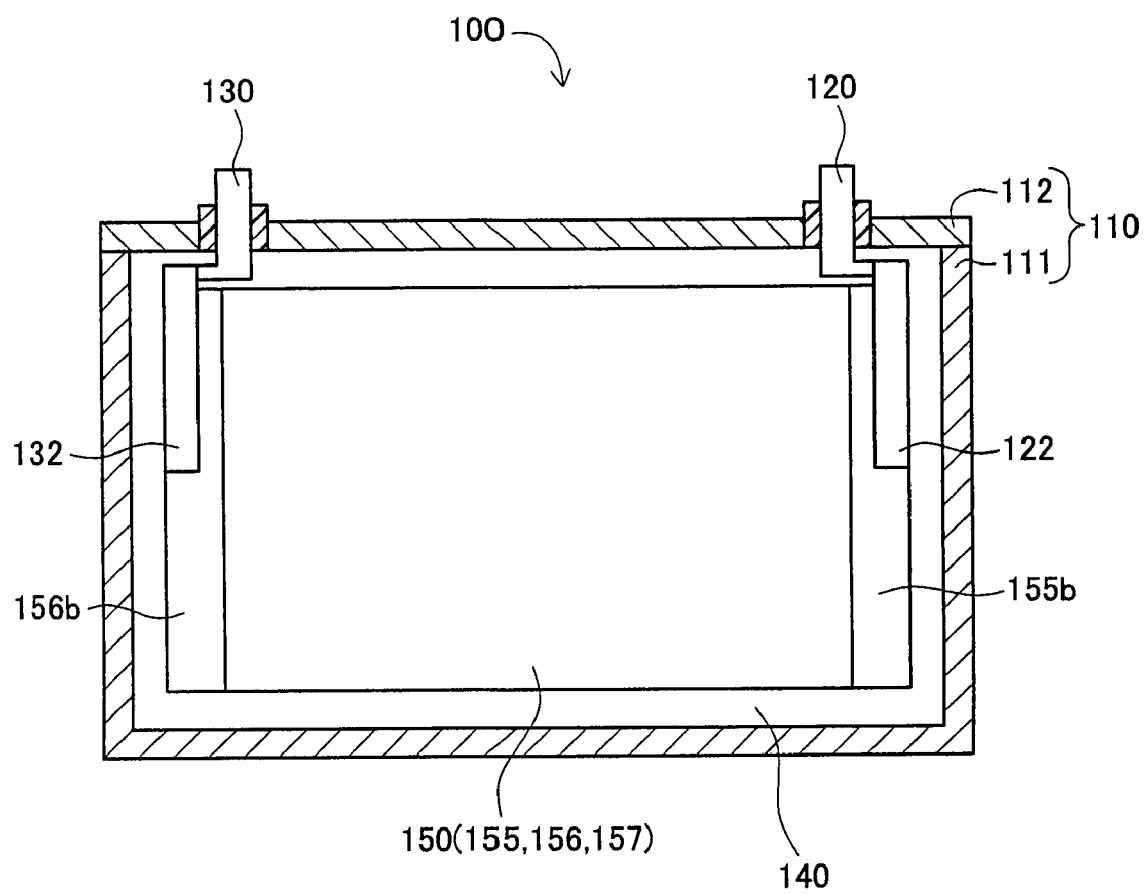
FIG. 4 is a sectional view of a lithium ion secondary cell.

The lithium ion secondary cell 100, as shown in FIG. 4, is a rectangular encapsulated lithium ion secondary cell which comprises a cell case 110 having a rectangular solid shape, a positive electrode terminal 120, and a negative electrode terminal 130. The cell case 110 includes a rectangular accommodation portion 111, which is formed of metal and provides an accommodation space having a rectangular solid shape, and a metal lid 112. The cell case 110 (the rectangular accommodation portion 111) houses an electrode body 150, a positive electrode collecting member 122, a negative electrode collecting member 132, and a nonaqueous electrolyte solution 140.

Figure 5:
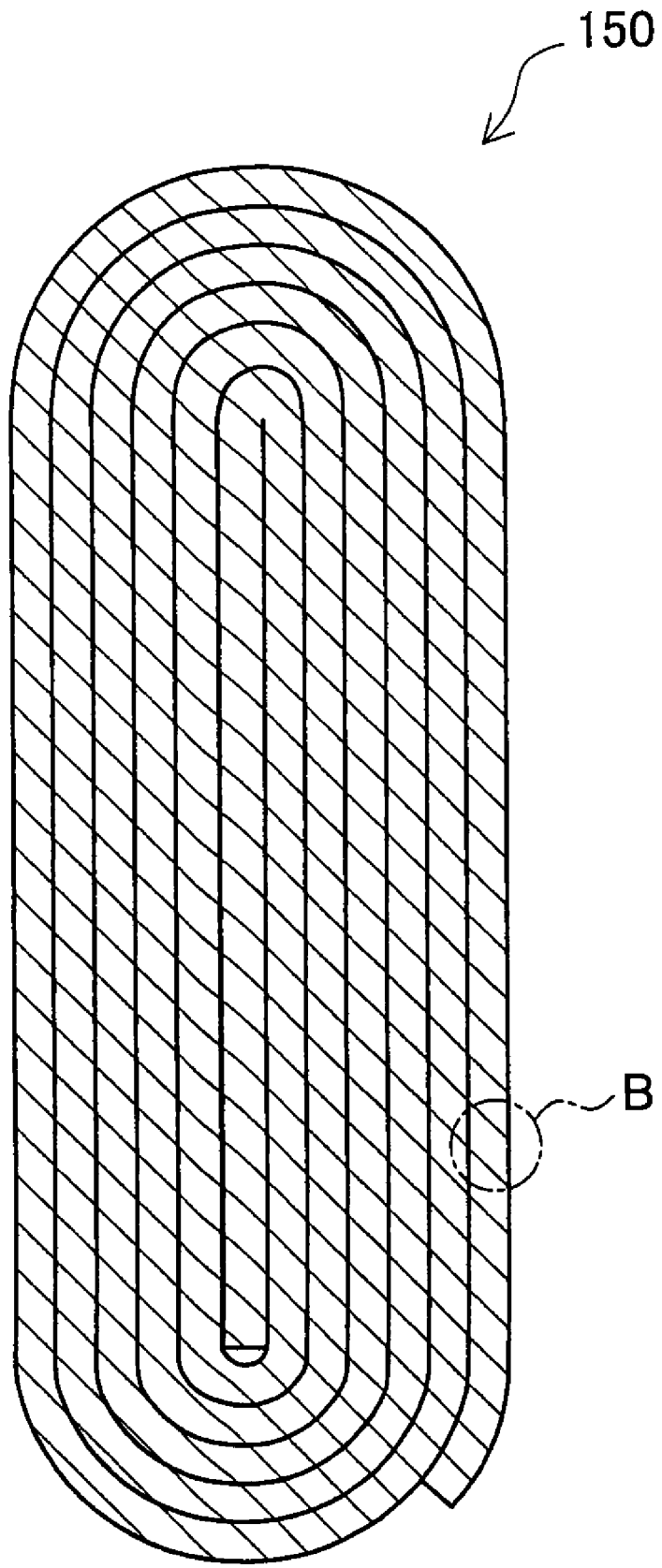
FIG. 5 is a sectional view of an electrode body.
Figure 6:
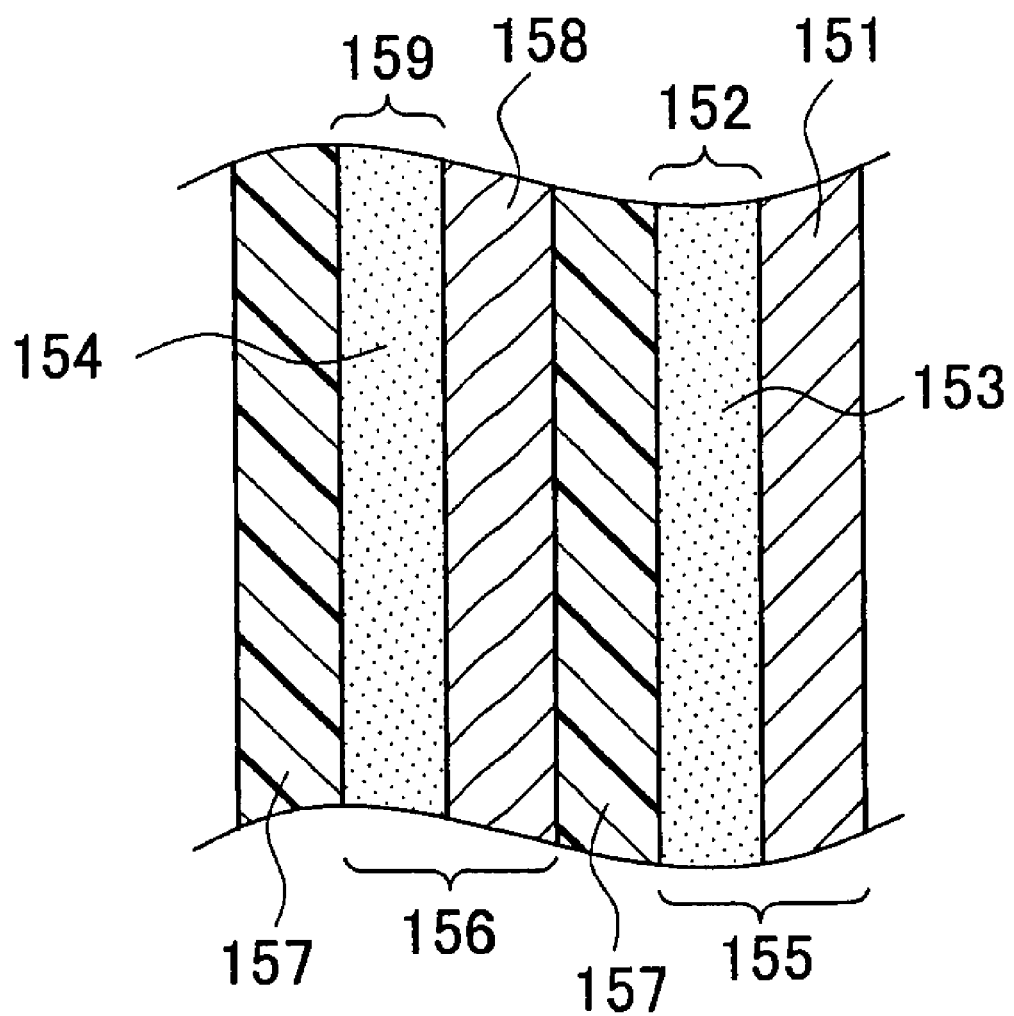
FIG. 6 is a partially enlarged sectional view of the electrode body corresponding to a portion B in FIG. 5.

The electrode body 150, as shown in FIG. 5, has an oval cross section, and is, as shown in FIG. 6, a flat wound body comprising a wound sheet-like positive electrode plate 155, a negative electrode plate 156, and a separator 157. The electrode body 150 has a positive electrode wound portion 155$b$ located at one end portion (in FIG. 4, the right end portion) in the axial direction (in FIG. 4, the left and right directions) and a negative electrode wound portion 156$b$ located at the other end portion (in FIG. 4, the left end portion). In the positive electrode wound portion 155$b$, only a part of the positive electrode plate 155 is stacked in a spiral manner. In the negative electrode wound portion 156$b$, only a part of the negative electrode plate 156 is stacked in a spiral manner. A positive electrode composite material 152 containing a positive-electrode active material 153 is coated onto the positive electrode plate 155 excluding the positive electrode wound portion 155$b$ (see FIG. 6). Likewise, a negative electrode composite material 159 containing a negative-electrode active material 154 is coated onto the negative electrode plate 156 excluding the negative electrode wound portion 156$b$ (see FIG. 6). The positive electrode wound portion 155$b$ is electrically connected to the positive electrode terminal 120 via the positive electrode collecting member 122. The negative electrode wound portion 156$b$ is electrically connected to the negative electrode terminal 130 via the negative electrode collecting member 132.

In the lithium ion secondary cell 100 of the embodiment 1, lithium nickel oxide is used as the positive-electrode active material 153. Also, a natural graphite-based carbon material is used as the negative-electrode active material 154. The nonaqueous electrolyte solution 140 is prepared by dissolving lithium hexafluorophosphate ($LiPF_6$) in a nonaqueous solvent mixed with EC (ethylene carbonate), DMC (dimethyl carbonate), and EMC (ethyl methyl carbonate).

Incidentally, the theoretical electrical capacity of the lithium ion secondary cell 100 is 5 Ah. Thus, 1 C corresponds to a current value of 5 A.

Next, a method for charging the lithium ion secondary cell 100 in the hybrid electric vehicle 1 of the embodiment 1 will be described with reference to FIG. 7.

First, in step S1, it is determined whether the storage amount of the lithium ion secondary cell 100 is lowered to the first predetermined value (in the embodiment 1, the storage amount corresponding to SOC 30%). Specifically, the cell controller 30 calculates the storage amount of the lithium ion secondary cell 100 based on the voltage V between terminals (the average value of the lithium ion secondary cells 100 constituting the assembled cell 10 for details) detected by the voltage detection detector 40 to estimate the SOC (State of Charge) of the lithium ion secondary cell 100 from the calculated storage amount. Then, it is determined whether the storage amount of the lithium ion secondary cell 100 is lowered to the first predetermined value based on the estimated SOC. In the embodiment 1, when the estimated SOC is lowered to 30%, it can be determined that the storage amount of the lithium ion secondary cell 100 is lowered to the first predetermined value.

When it is determined in step S1 that the storage amount of the lithium ion secondary cell 100 is not lowered to the first predetermined value (in the embodiment 1, the storage amount corresponding to SOC 30%) (No), the processing is terminated without starting charging.

Meanwhile, when it is determined in step S1 that the storage amount of the lithium ion secondary cell 100 is lowered to the first predetermined value (Yes), the flow proceeds to step S2, and it is determined whether the hybrid electric vehicle 1 is in the stop state. Specifically, it is determined whether the hybrid electric vehicle 1 is in the stop state based on the signal transmitted from the ECU 60. In the ECU 60, when the cell system 6 is in an activated state, and when the shift position is the "N position" or the "P position", it is determined that the hybrid electric vehicle 1 is in the stop state, and the ECU 60 transmits the stop state signal, indicating that the hybrid electric vehicle 1 is in the stop state, to the cell controller 30. Also, when the shift position is the "D position", and when an accelerator is not depressed and thus the speed of the hybrid electric vehicle 1 is "0", it is determined that the hybrid electric vehicle 1 is in the stop state, and the ECU 60 transmits the stop state signal to the cell controller 30. Thus, when the cell controller 30 detects the stop state signal transmitted from the ECU 60, it is determined that the hybrid electric vehicle 1 is in the stop state.

When it is determined in step S2 that the hybrid electric vehicle 1 is not in the stop state (No), the flow returns to step S1 again, and the above processing is performed.

Meanwhile, when it is determined in step S2 that the hybrid electric vehicle 1 is in the stop state (Yes), the flow proceeds to step S3, and it is determined whether the engine 3 mounted in the hybrid electric vehicle 1 is operating. Specifically, it is determined whether the engine 3 is operating based on the signal transmitted from the ECU 60. In the ECU 60, when the number of rotations of the engine 3 is not "0", it is determined that the engine 3 is operating, and the operating state signal indicating that the engine 3 is operating is transmitted to the cell controller 30. Thus, when the cell controller 30 detects the operating state signal transmitted from the ECU 60, it is determined that the engine 3 is operating.

When it is determined in step S3 that the engine 3 is not operating (No), the flow proceeds to step S4, and the start of the operation of the engine 3 is instructed. This instruction allows the engine 3 to be in the operating state (the idling state), and therefore the generator (alternator) 9 is driven.

Subsequently, the flow proceeds to step S5, charging of the lithium ion secondary cells 100 constituting the assembled cell 10 is started. Specifically, in such a state that the generator 9 is driven by the operation of the engine 3, the electric power generated by the generator 9 is supplied to the lithium ion secondary cells 100 constituting the assembled cell 10. In the embodiment 1, a constant current having a magnitude of 8 C (40 A) is supplied to the lithium ion secondary cell 100.

Thereafter, the flow proceeds to step S6, and it is determined whether the first split charging period KC1 has elapsed. In the embodiment 1, the length tc of the first split charging period KC1 is 67.5 seconds. Thus, it is determined whether 67.5 seconds have elapsed after the start of charging.

When the constant current of 8 C (40 A) is supplied to the lithium ion secondary cell 100 for 67.5 seconds, the electric quantity (0.75 Ah) corresponding to SOC 15% can be supplied to each of the lithium ion secondary cells 100. Thus, in the embodiment 1, in the first split charging period KC1 (67.5 seconds), the lithium ion secondary cell 100 with SOC lowered to 30% can be charged so that the SOC is restored to 45%.

When it is determined in step S6 that the first split charging period KO has not elapsed (No), the processing is repeated until the first split charging period KC1 elapses.

Thereafter, when it is determined in step S6 that the first split charging period KC1 has elapsed (Yes), the flow proceeds to step S7, the charging of the lithium ion secondary cell 100 is suspended.

Subsequently, the flow proceeds to step S8, and it is determined whether the charging suspension period KR has elapsed. In the embodiment 1, the length tr of the charging suspension period KR is 30 seconds. Thus, it is determined whether 30 seconds have elapsed after the suspension of charging.

When it is determined in step S8 that the charging suspension period KR has not elapsed (No), the processing is repeated until the charging suspension period KR elapses. Thereafter, in step S8, when it is determined that the charging suspension period KR has elapsed (Yes), the flow proceeds to step S9, and the charging of the lithium ion secondary cell 100 is started again.

Subsequently, the flow proceeds to step SA, and it is determined whether the storage amount of the lithium ion secondary cell 100 reaches the second predetermined value (in the embodiment 1, the storage amount corresponding to SOC 60%). Specifically, the cell controller 30 calculates the storage amount of the lithium ion secondary cell 100 based on the voltage V between terminals (specifically, the average value of the lithium ion secondary cells 100 constituting the assembled cell 100) detected by the voltage detector 40 to estimate the SOC of the lithium ion secondary cell 100 from the calculated storage amount. Then, based on the estimated SOC, it is determined whether the storage amount of the lithium ion secondary cell 100 has reached the second predetermined value. In the embodiment 1, when the estimated SOC has reached 60%, it can be determined that the storage amount of the lithium ion secondary cell 100 has reached the second predetermined value.

In the embodiment 1, in the first and second split charging periods KC1 and KC2, the lithium ion secondary cell 100 is charged with a constant current of 8 C (40 A). Thus, the length tc of the second split charging period KC2 is 67.5 seconds as with the first split charging period KC1. With regard to the lithium ion secondary cell 100 with SOC restored to 45%, the second split charging period KC2 corresponds to a period from when charging of the lithium ion secondary cell 100 is started again in step S9 till when the storage amount of the lithium ion secondary cell 100 reaches the second predetermined value (the storage amount corresponding to SOC 60%).

It is determined in step SA that the storage amount of the lithium ion secondary cell 100 has not reached the second predetermined value (No), the processing is repeated until the storage amount of the lithium ion secondary cell 100 has reached the second predetermined value. Thereafter, when it is determined in step SA that the storage amount of the lithium ion secondary cell 100 reaches the second predetermined value (Yes), the charging of the lithium ion secondary cell 100 is terminated.

In the method for charging of the embodiment 1, the processing of steps S7 and S8 are performed, whereby charging can be suspended within a period during which the storage amount of the lithium ion secondary cell 100 is charged from the first predetermined value (SOC 30%) to the second predetermined value (SOC 60%). The suspension of charging can enable Li ions, retained on the interface between the electrolytic solution and the negative electrode due to the diffusion control, to be diffused in the lithium ion secondary cell 100, and therefore, the deposition of metal Li on a negative electrode surface can be suppressed. This configuration can prevent the reduction of the electrical capacity caused by the deposition of metal Li.

Further, in the method for charging of the embodiment 1, the length tc of each split charging period is not less than 40 seconds (specifically, 67.5 seconds). When a single split charging period is long, the idling of the hybrid electric vehicle 1 can be stabilized even during the charging period, and therefore, the comfort of riding the hybrid electric vehicle is not lost.

Furthermore, in the method for charging of the embodiment 1, the length tc of each split charging period is 67.5 seconds, and the length tr of the charging suspension period is 30 seconds. Thus, tr/tc=30/67.5=0.44. When tr/tc is not less than 0.14, the deposition of metal Li on a negative electrode surface can be suppressed. Further, when tr/tc is not more than 0.9, the storage amount of the lithium ion secondary cell 100 can be rapidly and appropriately restored to the second predetermined value without spending useless charging suspension time.

It is to be noted that, in the embodiment 1, steps S5 to SA correspond to a charging step.

(Cycle Test)

The lithium ion secondary cell 100 is charged from the first predetermined value (the storage amount corresponding to SOC 30%) to the second predetermined value (the storage amount corresponding to SOC 60%) and thereafter discharged to be lowered to the first predetermined value. This charging and discharging cycle is determined as 1 cycle, and a cycle test is performed. The cycle test will be described hereinafter in detail.

Embodiments 1 and 2 and Comparison 1

First, the cycle test according to the embodiment 1 will be described. The lithium ion secondary cell 100 with the storage amount corresponding to SOC 30% is prepared. The lithium ion secondary cell 100 is charged in the above manner under a temperature environment at 15° C. until the SOC is restored to 60%. Specifically, the lithium ion secondary cell 100 is charged with a constant current of 40 A (8 C) for 67.5 seconds and thereafter, the charging is suspended for 30 seconds. Subsequently, the lithium ion secondary cell 100 is charged again with the constant current of 40 A (8 C) for 67.5 seconds. This configuration can restore the storage amount of the lithium ion secondary cell 100 to the storage amount corresponding to SOC 60%. Thereafter, the lithium ion secondary cell 100 is discharged with a constant current of 20 A (4 C), whereby the storage amount of the lithium ion secondary cell 100 is lowered so as to correspond to SOC 30%. This charging and discharging cycle is determined as 1 cycle and repeated for 128 cycles.

At that time, the discharge capacities in each of the cycles 40, 68, 89, and 128 was measured and the percentages of each of the discharge capacities relative to the initial capacity were calculated as a capacity maintenance ratio (%). The capacity maintenance ratios in each of the cycles 40, 68, 89, and 128 were 99.67%, 99.49%, 99.31%, and 98.53%, respectively. This result as a relation between the number of charging and discharging cycles and the capacity maintenance ratio is indicated by the chain line in FIG. 8.

In the embodiment 1, the number of the split charging periods is 2, the length tc of the split charging period is 67.5 seconds and the length tr of the charging suspension period is 30 seconds, whereby tr/tc=30/67.5=0.44.

Next, the cycle test according to the embodiment 2 will be described. The embodiment 2 was different from the embodiment 1 in that the lithium ion secondary cell 100 was charged under conditions that the number of the split charging periods was 3, and the length tc of the split charging period was 45 seconds. The conditions of discharging were the same as the embodiment 1. Under such conditions, the charging and discharging cycle was repeated for 113 cycles. At that time, the discharge capacities in each of the cycles 33, 58, 78, and 113 were measured and the percentages of each of the discharge capacities relative to the initial capacity were calculated as the capacity maintenance ratio (%). The capacity maintenance ratios in each of the cycles 33, 58, 78, and 113 were 99.77%, 99.68%, 99.56%, and 98.39%, respectively. This result is indicated by the solid line in FIG. 8.

In the embodiment 2, the length tc of the split charging period is 45 seconds and the length tr of the charging suspension period is 30 seconds, whereby tr/tc=30/45=0.67.

For comparison with the embodiments 1 and 2, the cycle test according to the comparison 1 was performed. The comparison 1 was different from the embodiments 1 and 2 in that charging was continuously performed without splitting the charging period. Specifically, the lithium ion secondary cell 100 was continuously charged with a constant current of 40 A (8 C) for 135 seconds, whereby the storage amount of the lithium ion secondary cell 100 was restored to the storage amount corresponding to SOC 60%. Thereafter, the lithium ion secondary cell 100 was discharged with a constant current of 20 A (4 C), whereby the storage amount of the lithium ion secondary cell 100 was lowered so as to correspond to SOC 30%. This charging and discharging cycle was determined as 1 cycle and repeated for 117 cycles. At that time, the discharge capacities in each of the cycles 16, 45, 81, and 117 were measured and the percentages of each of the discharge capacities relative to the initial capacity were calculated as the capacity maintenance ratio (%). The capacity maintenance ratios in each of the cycles 16, 45, 81, and 117 were 99.75%, 99.42%, 98.93%, and 97.78%, respectively. This result is indicated by the dashed line in FIG. 8.

Figure 8:
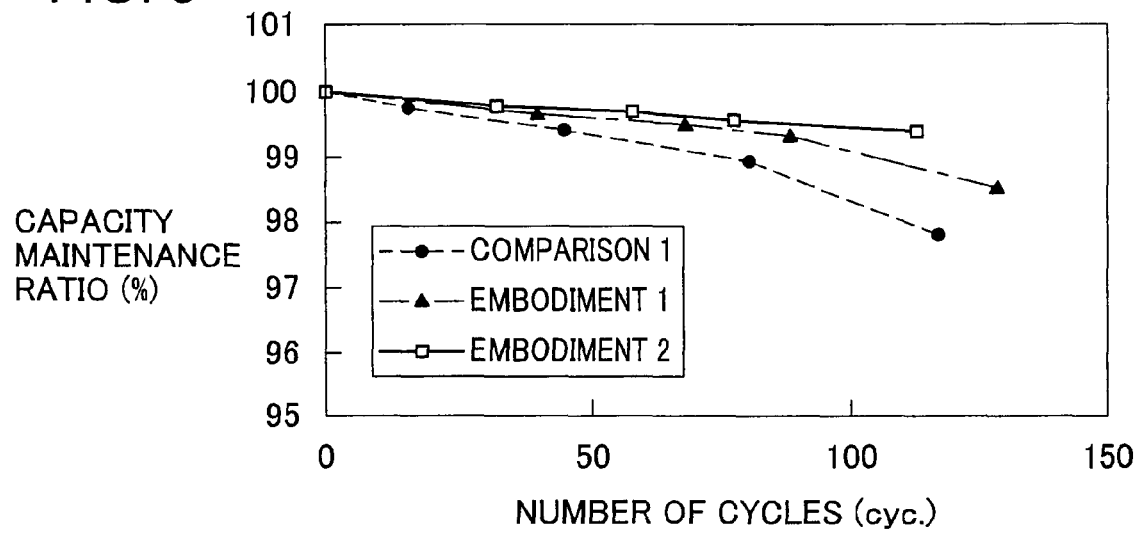
FIG. 8 is a graph showing a cycle test result according to the embodiments 1 and 2 and a comparison 1.

As shown in FIG. 8, in the embodiments 1 and 2, the reduction of the capacity maintenance ratio caused by the cycle test (the repetition of charging and discharging) was smaller than that in the comparison 1. This is because, in the embodiments 1 and 2, the charging period from the first predetermined value to the second predetermined value was split into two or more split charging periods and the charging suspension periods (non-charging periods) provided between the split charging periods. It can be considered that charging was suspended in the middle of the charging period, whereby Li ions retained on the interface between the electrolytic solution and the negative electrode due to the diffusion control was diffused in the lithium ion secondary cell 100. It can be said that the reduction of the electrical capacity caused by the deposition of metal Li was suppressed with this configuration.

Further, when the results of the embodiments 1 and 2 are compared with each other, the reduction of the capacity maintenance ratio in the embodiment 2 was smaller than that in the embodiment 1. It is considered that this is because, in the embodiment 2, the number of the split charging periods is larger than that in the embodiment 1, and thus the number of the charging suspension periods provided between the split charging periods is also larger than that in the embodiment 1 (the total charging period is also larger than that in the embodiment 1). This result shows that the larger the number of the split charging periods is, the greater the effect of suppressing the reduction of the electrical capacity caused by the deposition of metal Li is.

Embodiments 3 to 5 and Comparison 2

Embodiments 3 to 5 are different from the embodiment 1 in that the lithium ion secondary cell 100 was charged under conditions that the number of the split charging periods was 6, the length tc of the split charging period was 60 seconds, and the charging current was a constant current of 15 A (3 C). The conditions of discharging were the same as the embodiment 1. Under such conditions, the cycle test was performed. However, the embodiments 3 to 5 were different from each other in the length tr of the charging suspension period. The discharging current is a constant current of 7.5 A (1.5 C).

Specifically, in the embodiment 3, the charging and discharging cycle was repeated for 1613 cycles with the condition that the length tc of the charging suspension period is 10 seconds. At that time, the discharge capacities in each of the cycles 152, 506, 689, 909, 1161, 1394, and 1613 cycles were measured and the percentages of each of the discharge capacities relative to the initial capacity were calculated as the capacity maintenance ratio (%). The capacity maintenance ratios in each of the cycles 152, 506, 689, 909, 1161, 1394, and 1613 were 99.69%, 99.49%, 99.15%, 99.1%, 99.23%, 98.84%, and 98.93%, respectively. This result is indicated by the chain line in FIG. 9. In the embodiment 3, the length tc of the split charging period is 60 seconds and the length tr of the charging suspension period is 10 seconds, whereby tr/tc=10/60=0.17.

In the embodiment 4, the charging and discharging cycle was repeated for 1539 cycles with the condition that the length tr of the charging suspension period is 30 seconds. At that time, the discharge capacities in each of the cycles 145, 487, 661, 870, 1110, 1332, and 1539 cycles were measured and the percentages of each of the discharge capacities relative to the initial capacity were calculated as the capacity maintenance ratio (%). The capacity maintenance ratios in each of the cycles 145, 487, 661, 870, 1110, 1332, and 1539 were 99.75%, 99.5%, 99.13%, 99.05%, 99.1%, 98.75%, and 98.87%, respectively. This result is indicated by the solid line in FIG. 9. In the embodiment 4, the length tc of the split charging period is 60 seconds and the length tr of the charging suspension period is 30 seconds, whereby tr/tc=30/60=0.5.

In the embodiment 5, the charging and discharging cycle was repeated for 1443 cycles with the condition that the length tr of the charging suspension period is 50 seconds. At that time, the discharge capacities in each of the cycles 141, 462, 626, 821, 1043, 1249, and 1443 cycles were measured and the percentages of each of the discharge capacities relative to the initial capacity were calculated as the capacity maintenance ratio (%). The capacity maintenance ratios in each of the cycles 141, 462, 626, 821, 1043, 1249, and 1443 were 99.65%, 99.47%, 99.37%, 99.34%, 99.27%, 99.09%, and 98.95%, respectively. This result is indicated by the chain double-dashed line in FIG. 9. In the embodiment 5, the length tc of the split charging period is 60 seconds and the length tr of the charging suspension period is 50 seconds, whereby tr/tc=50/60=0.83.

For comparison with the embodiments 3 to 5, the cycle test according to the comparison 2 was performed. The comparison 2 was different from the embodiments 3 to 5 in that charging was continuously performed without splitting the charging period. Specifically, the lithium ion secondary cell 100 was continuously charged with a constant current of 15 A (3 C) for 360 seconds, whereby the storage amount of the lithium ion secondary cell 100 was restored to the storage amount corresponding to SOC 60%. Thereafter, the lithium ion secondary cell 100 was discharged with a constant current of 20 A (4 C), whereby the storage amount of the lithium ion secondary cell 100 was lowered so as to correspond to SOC 30%. This charging and discharging cycle was determined as 1 cycle and repeated for 1838 cycles. At that time, the discharge capacities in each of the cycles 173, 574, 785, 1036, 1321, 1589, and 1838 were measured and the percentages of each of the discharge capacities relative to the initial capacity were calculated as the capacity maintenance ratio (%). The capacity maintenance ratios in each of the cycles 173, 574, 785, 1036, 1321, 1589, and 1838 were 99.48%, 99.04%, 98.69%, 98.61%, 98.21%, 97.89%, and 97.68%, respectively. This result is indicated by the dashed line in FIG. 9.

Figure 9:
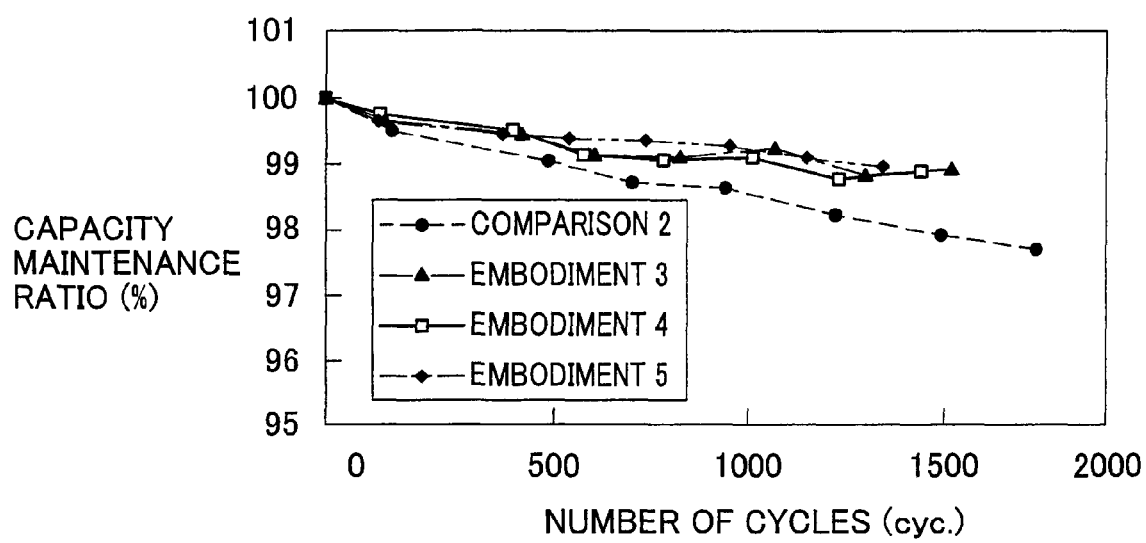
FIG. 9 is a graph showing a cycle test result according to the embodiments 3 to 5 and a comparison 2.

As shown in FIG. 9, in the embodiments 3 to 5, the reduction of the capacity maintenance ratio caused by the cycle test (the repetition of charging and discharging) was smaller than that in the comparison 2. This is because, in the embodiments 3 to 5, the charging period from the first predetermined value to the second predetermined value was split into two or more split charging periods and the charging suspension periods (non-charging periods) provided between the split charging periods.

Further, when the results of the embodiments 3 to 5 are compared with each other, the capacity maintenance ratio becomes larger in order of the embodiment 3, 4, and 5. This is because, although the number of the split charging periods is equal (namely, the number of the charging suspension periods is equal), the length tr of the charging suspension period is different (the length tr is increased in sequence). This result shows that even when the number of the split charging periods is equal (the number of the charging suspension periods is equal), the longer the length tr of the charging suspension period is, the greater the effect of suppressing the reduction of the electrical capacity caused by the deposition of metal Li is.

Embodiments 6 to 8 and Comparison 3

In embodiments 6 to 8, unlike the embodiment 1, the cycle test was performed at the test environment temperature of 0° C. However, in the embodiments 6 to 8, the lengths tr of the charging suspension periods were respectively 10 seconds, 30 seconds, and 60 seconds. The conditions of discharging were the same as the embodiment 1.

Specifically, in the embodiment 6, the charging and discharging cycle was repeated for 897 cycles with the condition that the length tr of the charging suspension period is 10 seconds. At that time, the discharge capacities in each of the cycles 15, 55, 200, 403, 461, 603, and 897 were measured and the percentages of each of the discharge capacities relative to the initial capacity were calculated as the capacity maintenance ratio (%). The capacity maintenance ratios in each of the cycles 15, 55, 200, 403, 461, 603, and 897 were 99.63%, 99.23%, 98.37%, 97.62%, 97.13%, 95.63% and 89.19%, respectively. This result is indicated by the chain line in FIG. 10. In the embodiment 6, the length tc of the split charging period is 67.5 seconds and the length tr of the charging suspension period is 10 seconds, whereby tr/tc=10/67.5=0.148.

In the embodiment 7, the charging and discharging cycle was repeated for 891 cycles with the condition that the length tr of the charging suspension period is 30 seconds. At that time, the discharge capacities in each of the cycles 15, 55, 155, 384, 450, 584, and 891 were measured and the percentages of each of the discharge capacities relative to the initial capacity were calculated as the capacity maintenance ratio (%). The capacity maintenance ratios in each of the cycles 15, 55, 155, 384, 450, 584, and 891 were 99.61%, 99.22%, 98.44%, 98.04%, 97.78%, 96.98% and 90.63%, respectively. This result is indicated by the solid line in FIG. 10. In the embodiment 7, the length tc of the split charging period is 67.5 seconds and the length tr of the charging suspension period is 30 seconds, whereby tr/tc=30/67.5=0.44.

In the embodiment 8, the charging and discharging cycle was repeated for 892 cycles with the condition that the length tr of the charging suspension period is 60 seconds. At that time, the discharge capacities in each of the cycles 15, 54, 211, 388, 455, 588, and 892 were measured and the percentages of each of the discharge capacities relative to the initial capacity were calculated as the capacity maintenance ratio (%). The capacity maintenance ratios in each of the cycles 15, 54, 211, 388, 455, 588, and 892 were 99.69%, 99.38%, 98.45%, 98.07%, 97.74%, 97.13% and 91.76%, respectively. This result is indicated by the chain double-dashed line in FIG. 10. In the embodiment 8, the length tc of the split charging period is 67.5 seconds and the length tr of the charging suspension period is 60 seconds, whereby tr/tc=60/67.5=0.89.

For comparison with the embodiments 6 to 8, the cycle test according to the comparison 3 was performed. The comparison 3 is different from the embodiments 6 to 8 in that charging was continuously performed without splitting the charging period. With regard to discharging in the comparison 3, as in the embodiments 6 to 8, the charging and discharging cycle is repeated 889 cycles. At that time, the discharge capacities in each of the cycles 15, 55, 161, 282, 351, 516, and 889 were measured and the percentages of each of the discharge capacities relative to the initial capacity were calculated as the capacity maintenance ratio (%). The capacity maintenance ratios in each of 15, 55, 161, 282, 351, 516, and 889 were 99.62%, 99.29%, 98.49%, 97.8%, 97.12%, 95.64%, 87.8%, respectively. This result is indicated by the dashed line in FIG. 10.

Figure 10:
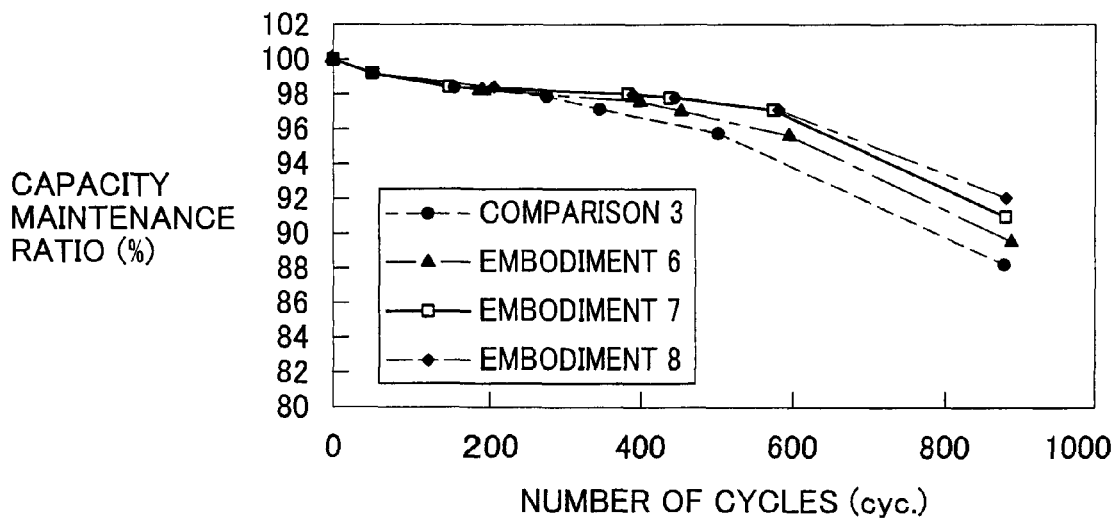
FIG. 10 is a graph showing a cycle test result according to the embodiments 6 to 8 and a comparison 3.

As shown in FIG. 10, in the embodiments 6 to 8, the reduction of the capacity maintenance ratio caused by the cycle test (the repetition of charging and discharging) is smaller than that in the comparison 3. This is because, in the embodiments 6 to 8, the charging period from the first predetermined value to the second predetermined value was split into two split charging periods and the charging suspension period (non-charging period) provided between the two split charging periods.

Further, when the results of the embodiments 6 to 8 are compared with each other, the capacity maintenance ratio becomes larger in order of the embodiment 6, 7, and 8. This is because, although the number of the split charging periods is equal (namely, the number of the charging suspension periods is equal), the length tr of the charging suspension period is different (the length tr is increased in sequence). This result shows that even when the number of the split charging periods is equal (the number of the charging suspension periods is equal), the longer the length tr of the charging suspension period is, the greater the effect of suppressing the reduction of the electrical capacity caused by the deposition of metal Li is.

When the charging suspension period is too long relative to the split charging period, the storage amount of the lithium ion secondary cell 100 may not be able to be restored to the second predetermined value (the storage amount corresponding to SOC 60% in the embodiments 1 to 8) while the hybrid electric vehicle 1 stops running. It is sufficient for the charging suspension period to have a length allowing the diffusion of Li ions retained on the interface between the electrolytic solution and the negative electrode due to the diffusion control, and there is no use in suspending charging over the relevant period.

Thus, when the results of the tests of the embodiments 7 and 8 are studied in detail, up to approximately 600 cycles, the capacity maintenance ratio in the embodiment 8 is larger than that in the embodiment 7; however, the difference is very small. In the embodiment 8, the length tc of the split charging period is 67.5 seconds, and the length tr of the charging suspension period is 60 seconds, whereby tr/tc is about 0.9. Thus, even when the charging suspension period is longer than the charging suspension period in the embodiment 8, and thus tr/tc is more than 0.9, only to prolong the charging period K, during which the storage amount of the lithium ion secondary cell 100 is restored to the second predetermined value, and there is little effect of heightening the capacity maintenance ratio.

According to the above results, the ratio tr/tc between the length tc of each split charging period and the length tr of the charging suspension period immediately after the split charging period is preferably not more than 0.9. This configuration can enable the storage amount of the lithium ion secondary cell 100 to rapidly and appropriately restore to the second predetermined value without spending useless charging suspension time.

Embodiments 9 and 10

In embodiments 9 and 10, the cycle test was performed at a test environment temperature of 0° C. as in the embodiments 6 to 8. However, in the embodiments 9 and 10 the lengths tr of the charging suspension period were 1 second and 5 seconds, respectively.

In the embodiment 9, the charging and discharging cycle was repeated for 428 cycles with the condition that the length tr of the charging suspension period is 1 second. At that time, the discharge capacities in each of the cycles 16, 59, 212, and 428 were measured and the percentages of each of the discharge capacities relative to the initial capacity were calculated as the capacity maintenance ratio (%). The capacity maintenance ratios in each of the cycles 16, 59, 212, and 428 were, respectively, 99.75%, 99.05%, 98.12%, and 96.54%. This result is indicated by the solid line in FIG. 11. In the embodiment 9, the length tc of the split charging period is 67.5 seconds, and the length tr of the charging suspension period is 1 second, whereby tr/tc=1/67.5=0.015.

In the embodiment 10, the charging and discharging cycle was repeated for 418 cycles with the condition that the length tr of the charging suspension period is 5 seconds. At that time, the discharge capacities in each of the cycles 16, 56, 206, and 418 were measured and the percentages of each of the discharge capacities relative to the initial capacity were calculated as the capacity maintenance ratio (%). The capacity maintenance ratios in each of the cycles 16, 56, 206, and 418 were 99.55%, 98.99%, 98.05%, and 96.31%, respectively. This result is indicated by the chain double-dashed line in FIG. 11. In the embodiment 10, the length tc of the split charging period is 67.5 seconds and the length tr of the charging suspension period is 5 seconds, whereby tr/tc=5/67.5=0.074.

Figure 11:
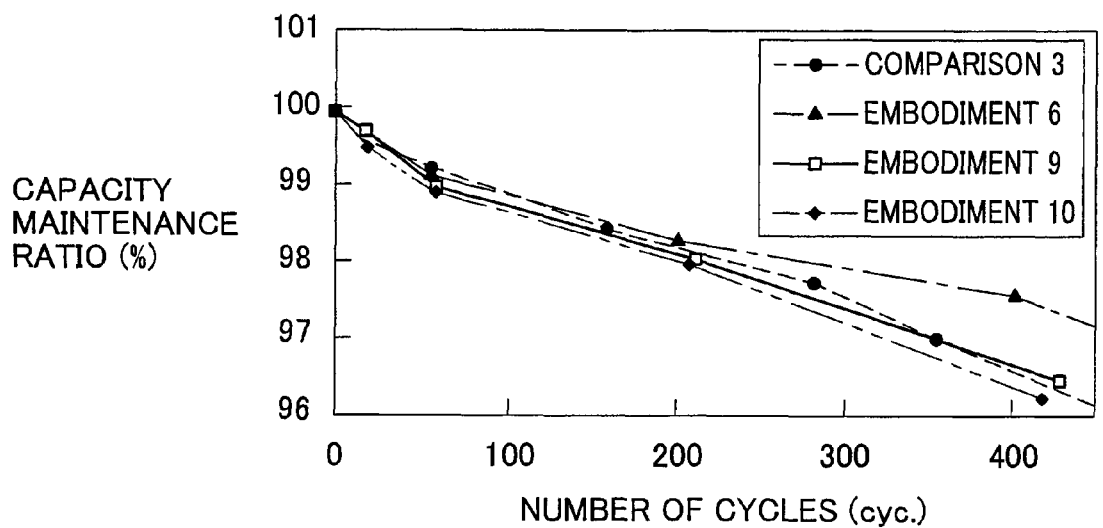
FIG. 11 is a graph showing a cycle test result according to the embodiments 6, 9, and 10 and the comparison 3.

The results of the tests in the embodiment 6 and the comparison 3 are shown respectively by the chain line and the dashed line in FIG. 11. The ratio tr/tc in each of the comparison 3 and the embodiments 9, 10, and 6 is 0, 0.015, 0.074, and 0.148 in this order.

As shown in FIG. 11, in the embodiments 9 and 10, the rate of the capacity reduction is rarely different from the rate in the comparison 3. This is because, since the length tr of the charging suspension period was too short relative to the length tc of the split charging period (specifically, tr/tc is 0.015 and 0.074), Li ions retained on the interface between the electrolytic solution and the negative electrode due to the diffusion control could not satisfactorily be diffused, whereby the deposition of metal Li on the negative electrode surface could not satisfactorily be suppressed. Meanwhile, in the embodiment 6, since tr/tc is not less than 0.14, it is clear that the capacity maintenance ratio is higher than that in the comparison 3.

According to the above results, the ratio tr/tc between the length tc of each split charging period and the length tr of the charging suspension period immediately after the split charging period is preferably not less than 0.14. This configuration can satisfactorily suppress the deposition of metal Li on the negative electrode surface.

Embodiments 11 and 12 and Comparison 4

In embodiments 11 and 12, unlike the embodiment 1, the lithium ion secondary cell 100 was charged under such changed conditions that the test environment temperature is −15° C., the charging current was a constant current of 20 A (4 C), and the length tc of the split charging period was 136.5 seconds and 91 seconds. The conditions of discharging were the same as those in the embodiment 1. Under such conditions, the cycle test was performed. However, the embodiments 11 and 12 were different from each other in the number of the split charging periods. The discharging current was changed to a constant current of 10 A (2 C).

Specifically, in the embodiment 11, the charging and discharging cycle was repeated for 506 cycles with the condition that the number of the split charging periods was 2. At that time, the discharge capacities in each of the cycles 27, 103, 278, 447, and 506 were measured and the percentages of each of the discharge capacities relative to the initial capacity were calculated as the capacity maintenance ratio (%). The capacity maintenance ratios in each of the cycles 27, 103, 278, 447, and 506 were 99.63%, 99.02%, 97.6%, 95.78%, and 94.73%, respectively. This result is indicated by the chain line in FIG. 12. In the embodiment 11, the length tc of the split charging period is 136.5 seconds and the length tr of the charging suspension period is 30 seconds, whereby tr/tc=30/136.5=0.22.

In the embodiment 12, the charging and discharging cycle was repeated for 447 cycles with the condition that the number of the split charging periods was 3. At that time, the discharge capacities in each of the cycles 24, 93, 245, 396, and 447 were measured and the percentages of each of the discharge capacities relative to the initial capacity were calculated as the capacity maintenance ratio (%). The capacity maintenance ratios in each of the cycles 24, 93, 245, 396, and 447 were 99.6%, 99.12%, 98.23%, 97.26%, and 96.76%, respectively. This result is indicated by the solid line in FIG. 12. In the embodiment 12, the length tc of the split charging period is 91 seconds and the length tr of the charging suspension period is 30 seconds, whereby tr/tc=30/91=0.33.

For comparison with the embodiments 11 and 12, the cycle test according to the comparison 4 was performed. The comparison 4 is different from the embodiments 11 and 12 in that charging was continuously performed without splitting the charging period. With regard to discharging in the comparison 4, the charging and discharging cycle is repeated 531 cycles as in the embodiments 11 and 12. At that time, the discharge capacities in each of the cycles 45, 118, 214, 254, 374, and 531 were measured and the percentages of each of the discharge capacities relative to the initial capacity were calculated as the capacity maintenance ratio (%). The capacity maintenance ratios in each of 45, 118, 214, 254, 374, and 531 were 99.34%, 98.95%, 97.89%, 97.17%, 94.9%, and 90.49%, respectively. This result is indicated by the dashed line in FIG. 12.

Figure 12:
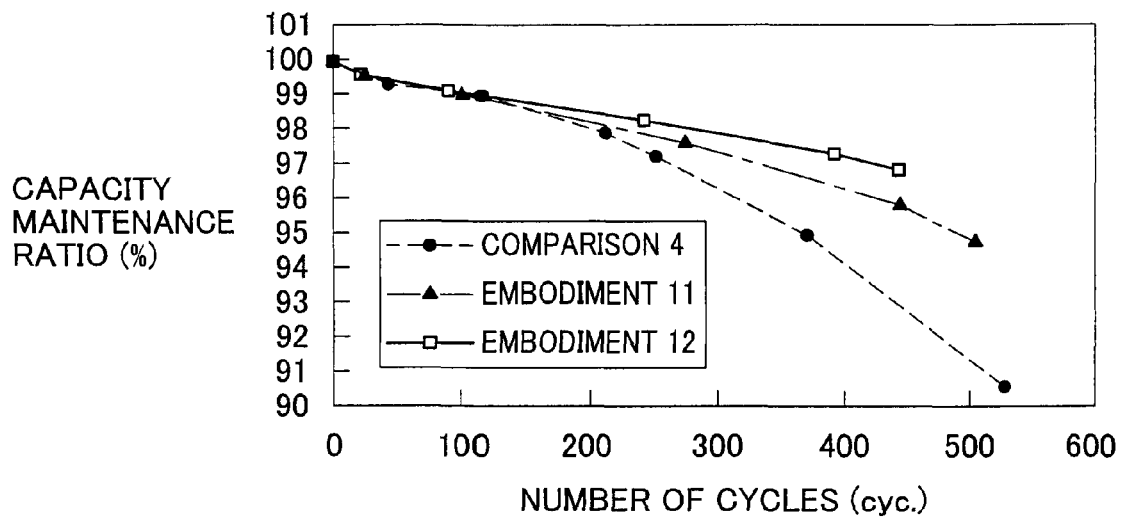
FIG. 12 is a graph showing a cycle test result according to the embodiments 11 and 12 and a comparison 4.

As shown in FIG. 12, in the embodiments 11 and 12, the reduction of the capacity maintenance ratio caused by the cycle test (the repetition of charging and discharging) was smaller than that in the comparison 4. This is because, in the embodiments 11 and 12, the charging period from the first predetermined value to the second predetermined value was split into two or more split charging periods and the charging suspension periods (non-charging periods) provided between the split charging periods.

Further, when the results of the embodiments 11 and 12 are compared with each other, the reduction of the capacity maintenance ratio in the embodiment 12 was smaller than that in the embodiment 11. It is considered that this is because, in the embodiment 12, the number of the split charging periods is larger than that in the embodiment 11, and thus the number of the charging suspension periods provided between the split charging periods is also larger than that in the embodiment 11 (the total charging period is also larger than that in the embodiment 11). This result shows that the larger the number of the split charging periods is, the greater the effect of suppressing the reduction of the electrical capacity caused by the deposition of metal Li is.

Embodiments 13 and 14 and Comparison 5

Next, unlike the embodiment 1 and other embodiments, the cycle tests according to embodiments 13 and 14 and a comparison 5 were performed under such a changed condition that the second predetermined value was the storage amount corresponding to SOC 50%.

In the embodiments 13 and 14, unlike the embodiment 1, the cycle tests were performed under such changed conditions that the test environment temperature as −15° C., the charging current was a constant current of 10 A (2 C), the length tc of the split charging period was 60 seconds, and the number of the split charging periods was 6. However, the embodiments 13 and 14 were different in the length tr of the charging suspension period. The discharging current was changed to a constant current of 5 A (1 C).

Specifically, in the embodiment 13, the charging and discharging cycle was repeated for 1346 cycles with the condition that the length of the charging suspension period is 10 seconds. At that time, the discharge capacities in each of the cycles 133, 434, 586, 765, 974, 1166, and 1346 cycles were measured and the percentages of each of the discharge capacities relative to the initial capacity were calculated as the capacity maintenance ratio (%). The capacity maintenance ratios in each of the cycles 133, 434, 586, 765, 974, 1166, and 1346 were 99.61%, 99.45%, 99.25%, 98.89%, 98.83%, 98.71%, and 98.52%, respectively. This result is indicated by the chain line in FIG. 13. In the embodiment 13, the length tc of the split charging period is 60 seconds and the length tr of the charging suspension period is 10 seconds, whereby tr/tc=10/60=0.17.

In the embodiment 14, the charging and discharging cycle was repeated for 1254 cycles with the condition that the length of the charging suspension period is 30 seconds. At that time, the discharge capacities in each of the cycles 124, 405, 546, 711, 906, 1086, and 1254 cycles were measured and the percentages of each of the discharge capacities relative to the initial capacity were calculated as the capacity maintenance ratio (%). The capacity maintenance ratios in each of the cycles 124, 405, 546, 711, 906, 1086, and 1254 were 99.75%, 99.61%, 99.38%, 99.12%, 98.97%, 98.92%, and 98.84%, respectively. This result is indicated by the solid line in FIG. 13. In the embodiment 14, the length tc of the split charging period is 60 seconds and the length tr of the charging suspension period is 30 seconds, whereby tr/tc=30/60=0.5.

For comparison with the embodiments 13 and 14, the cycle test according to the comparison 5 was performed. The comparison 5 is different from the embodiments 13 and 14 in that charging was continuously performed without splitting the charging period. With regard to discharging in the comparison 5, the charging and discharging cycle is repeated 1531 cycles as in the embodiments 13 and 14. At that time, the discharge capacities in each of the cycles 150, 496, 666, 872, 1110, 1329, and 1531 were measured and the percentages of each of the discharge capacities relative to the initial capacity were calculated as the capacity maintenance ratio (%). The capacity maintenance ratios in each of 150, 496, 666, 872, 1110, 1329, and 1531 were 99.59%, 99.24%, 98.95%, 98.43%, 97.92%, 97.43%, and 96.58%, respectively. This result is indicated by the dashed line in FIG. 13.

Figure 13:
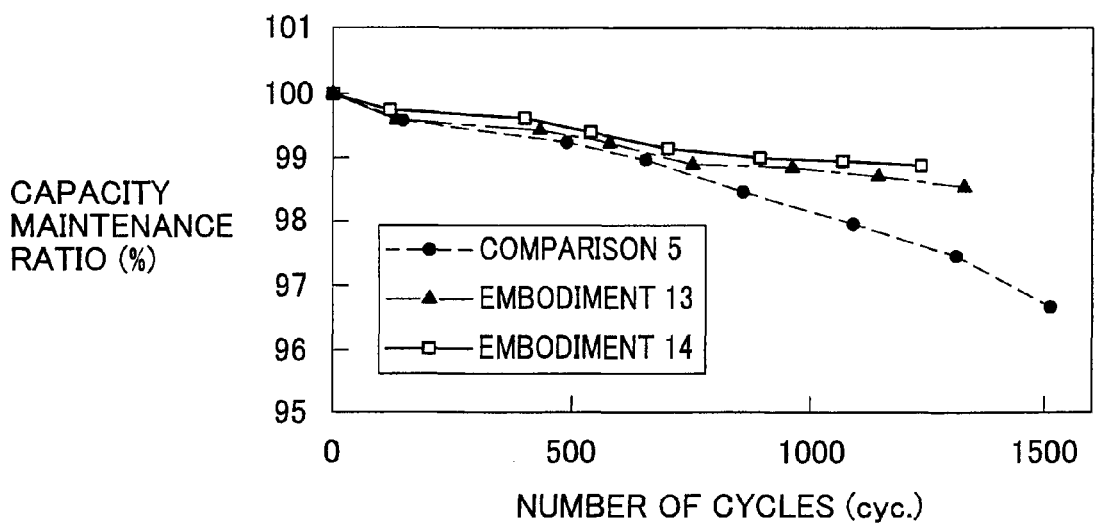
FIG. 13 is a graph showing a cycle test result according to the embodiments 13 and 14 and a comparison 5.

As shown in FIG. 13, in the embodiments 13 and 14, the reduction of the capacity maintenance ratio caused by the cycle test (the repetition of charging and discharging) was smaller than that in the comparison 5. This is because, in the embodiments 13 and 14, the charging period from the first predetermined value to the second predetermined value was split into two or more split charging periods and the charging suspension periods (non-charging periods) provided between the split charging periods.

Further, when the results of the tests in the embodiments 13 and 14 are compared with each other, the capacity maintenance ratio in the embodiment 14 is larger than that in the embodiment 13. This is because, although the embodiments 13 and 14 have the same number of the split charging periods (namely, they have the same number of the charging suspension periods), the length tr of the charging suspension period in the embodiment 14 is longer than that in the embodiment 13. This result shows that even when the number of the split charging periods is equal (the number of the charging suspension periods is equal), the longer the length tr of the charging suspension period is, the greater the effect of suppressing the reduction of the electrical capacity caused by the deposition of metal Li is.

Embodiment 15

In an embodiment 15, unlike the embodiment 1, the non-charging period is the discharging period. In other words, discharging is performed over the entire non-charging period.

Specifically, the cell controller 30 splits the charging period before the storage amount of the lithium ion secondary cell 100 reaches the second predetermined value into three split charging periods (first to third split charging periods) and the non-charging periods provided between the split charging periods. Then, charging is performed in the split charging period, and discharging is performed in the non-charging period. In other words, charging and discharging are repeated in order of "charging, discharging, charging, discharging, and charging" so that the storage amount is restored to the second predetermined value.

Next, the method for charging the lithium ion secondary cell 100 for the hybrid electric vehicle 1 in the embodiment 15 will be described with reference to FIGS. 15 and 16.

Figure 15:
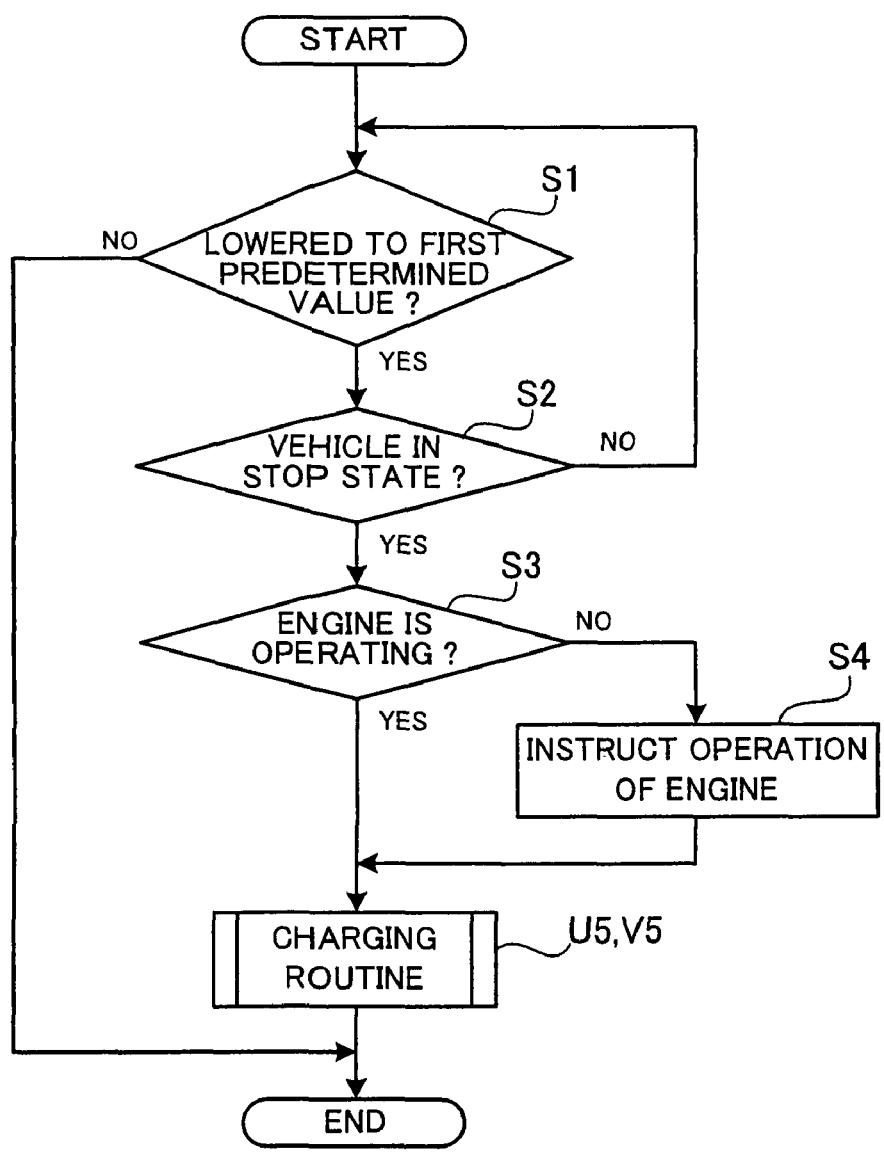
FIG. 15 is a flow chart showing a flow of charging method for charging the lithium ion secondary cell according to the embodiments 15 to 17.

As shown in FIG. 15, the processing from steps S1 to S4 is performed as in the embodiment 1. Subsequently, the flow proceeds to a charging routine of step U5. Specifically, as shown in FIG. 16, in step U51, charging of the lithium ion secondary cells 100 constituting the assembled cell 10 is started. Specifically, in such a state that the generator 9 is being driven by the operation of the engine 3, the electric power generated by the generator 9 is supplied to the lithium ion secondary cells 100 constituting the assembled cell 10. In the embodiment 15, a constant current having a magnitude of 3 C (15 A) is supplied to the lithium ion secondary cell 100.

Thereafter, the flow proceeds to step U52, and it is determined whether the first split charging period has elapsed. In the embodiment 15, the length of the first split charging period is 120 seconds. Thus, it is determined whether 120 seconds have elapsed after the start of charging.

When the lithium ion secondary cell 100 is charged for 120 seconds with a constant current of 3 C (15 A), the electric capacity (0.5 Ah) corresponding to SOC 10% can be supplied to each of the lithium ion secondary cells 100. Thus, in the embodiment 15, in the first split charging period (120 seconds), the lithium ion secondary cell 100 with SOC lowered to 30% can be charged so that the SOC is restored to 40%.

In step U52, when it is determined that the first split charging period has not elapsed (No), the processing is repeated until the first split charging period elapses.

Thereafter, in step U52, when it is determined that the first split charging period has elapsed (Yes), the flow proceeds to step U53, and charging of the lithium ion secondary cell 100 is stopped to start discharging. In the embodiment 15, discharging is performed with a constant current of 7.5 A.

Subsequently, the flow proceeds to step U54, and it is determined whether the discharging period has elapsed. In the embodiment 15, the length of the discharging period is 0.5 second. Thus, it is determined whether 0.5 second has elapsed after the start of discharging.

When it is determined in step U54 that the discharging period has not elapsed (No), the processing is repeated until the discharging period elapses. Thereafter, when it is determined in step U54 that the discharging period has elapsed (Yes), the flow proceeds to step U55, and charging of the lithium ion secondary cell 100 is started again.

Thereafter, the flow proceeds to step U56, and it is determined whether the second split charging period has elapsed. In the embodiment 15, the length of the second split charging period is 120 seconds. Thus, it is determined whether 120 seconds have elapsed after the start of charging.

When the lithium ion secondary cell 100 is charged for 120 seconds with a constant current of 3 C (15 A), the electric capacity (0.5 Ah) corresponding to SOC 10% can be supplied to each of the lithium ion secondary cells 100. Thus, in the embodiment 15, in the second split charging period (120 seconds), the lithium ion secondary cell 100 with SOC of 40% can be charged so that the SOC is restored to 50%.

When it is determined in step U56 that the second split charging period has not elapsed (No), the processing is repeated until the second split charging period elapses.

Thereafter, when it is determined in step U56 that the second split charging period has elapsed (Yes), the flow proceeds to step U57, and charging of the lithium ion secondary cell 100 is stopped to start discharging. As in the above case, discharging is performed with a constant current of 7.5 A.

Then, the flow proceeds to step U58, whether the discharging period has elapsed is determined. As in the above case, the length of the discharging period is 0.5 second. Thus, it is determined whether 0.5 second has elapsed after the start of discharging.

When it is determined in step U58 that the discharging period has not elapsed (No), the processing is repeated until the discharging period elapses. Thereafter, when it is determined in step U58 that the discharging period has elapsed (Yes), the flow proceeds to step U59, and charging of the lithium ion secondary cell 100 is started again.

Then, the flow proceeds to step U5A, and, as in step SA of the embodiment 1, it is determined whether the storage amount of the lithium ion secondary cell 100 has reached the second predetermined value (also in the embodiment 15, the storage amount corresponding to SOC 60%). Also in the embodiment 15, when the estimated SOC reaches 60%, it can be determined that the storage amount of the lithium ion secondary cell 100 has reached the second predetermined value.

In the embodiment 15, the lithium ion secondary cell 100 is charged with a constant current of 3 C (15 A) in the first, second, and third split charging periods. Thus, the length of the third split charging period is 120 seconds as in the first split charging period. The third split charging period corresponds to a period from when charging of the lithium ion secondary cell 100 with SOC restored to 50% is started again in step U59 till when the storage amount of the lithium ion secondary cell 100 reaches the second predetermined value (the storage amount corresponding to SOC 60%).

When it is determined in step U5A that the storage amount of the lithium ion secondary cell 100 has not reached the second predetermined value (No), the processing is repeated until the storage amount reaches the second predetermined value. Thereafter, when it is determined in step U5A that storage amount of the lithium ion secondary cell 100 has reached the second predetermined value (Yes), the flow returns to the main routine of FIG. 15, and charging is terminated.

It is to be noted that, in the embodiment 15, steps U51 to U5A correspond to the charging step.

Embodiment 16

An embodiment 16 is different from the embodiment 15 only in the length of the discharging period, and the other conditions are the same as those in the embodiment 15. Specifically, in the embodiment 16, the lithium ion secondary cell 100 is charged (steps U51 to U5A) under such a condition that the length of each discharging period is 1.0 second.

Embodiment 17

An embodiment 17 is different from the embodiment 15 in that the non-charging period includes the charging suspension period and the discharging period. Namely, suspension of charging and discharging are performed in each non-charging period.

Specifically, the cell controller 30 splits the charging period until the storage amount of the lithium ion secondary cell 100 reaches the second predetermined value into three split charging periods (first to third split charging periods) and the non-charging periods provided between the split charging periods. Charging is performed in each split charging period and suspension of charging and discharging are performed in each non-charging period. Namely, charging, suspension of charging, and discharging are repeated in order of "charging, suspension, discharging, charging, suspension, discharging, and charging" so that the storage amount is restored to the second predetermined value.

Next, the method for charging the lithium ion secondary cell 100 for the hybrid electric vehicle 1 in the embodiment 17 will be described with reference to FIGS. 15 and 18.

As shown in FIG. 15, the processing from steps S1 to S4 is performed as in the embodiment 15. Subsequently, the flow proceeds to a charging routine of step V5. Specifically, as shown in FIG. 18, in step V51, charging of the lithium ion secondary cells 100 constituting the assembled cell 10 is started. Specifically, in such a state that the generator 9 is being driven by the operation of the engine 3, the electric power generated by the generator 9 is supplied to the lithium ion secondary cells 100 constituting the assembled cell 10. In the embodiment 17, a constant current having a magnitude of 3 C (15 A) is supplied to the lithium ion secondary cell 100.

Thereafter, the flow proceeds to step V52, and it is determined whether the first split charging period has elapsed. In the embodiment 17, the length of the first split charging period is 120 seconds. Thus, it is determined whether 120 seconds have elapsed after the start of charging.

When the lithium ion secondary cell 100 is charged for 120 seconds with a constant current of 3 C (15 A), the electric quantity (0.5 Ah) corresponding to SOC 10% can be supplied to each of the lithium ion secondary cells 100. Thus, in the embodiment 17, in the first split charging period (120 seconds), the lithium ion secondary cell 100 with SOC lowered to 30% can be charged so that the SOC is restored to 40%.

When it is determined in step V52 that the first split charging period has not elapsed (No), the processing is repeated until the first split charging period elapses.

Thereafter, when it is determined in step V52 that the first split charging period has elapsed (Yes), the flow proceeds to step V53, charging of the lithium ion secondary cell 100 is suspended.

Subsequently, the flow proceeds to step V54, and it is determined whether the charging suspension period has elapsed. In the embodiment 17, the length of charging suspension period is 30 seconds. Thus, it is determined whether 30 seconds have elapsed after the suspension of charging.

When it is determined in step V54 that the charging suspension period has not elapsed (No), the processing is repeated until the charging suspension period elapses. Thereafter, when it is determined in step V54 that the charging suspension period has elapsed (Yes), the flow proceeds to step V55, and discharging of the lithium ion secondary cell 100 is started. Also in the embodiment 17, discharging is performed with a constant current of 7.5 A.

Subsequently, the flow proceeds to step V56, and it is determined whether the discharging period has elapsed. In the embodiment 17, the length of the discharging period is 1.0 second as in the embodiment 16. Thus, it is determined whether 1.0 second has elapsed after the start of discharging.

When it is determined in step V56 that the discharging period has not elapsed (No), the processing is repeated until the discharging period elapses. Thereafter, when it is determined in step V56 that the discharging period has elapsed (Yes), the flow proceeds to step V57, and charging of the lithium ion secondary cell 100 is started again.

Thereafter, the flow proceeds to step V58, and it is determined whether the second split charging period has elapsed. In the embodiment 17, the length of the second split charging period is 120 seconds. Thus, it is determined whether 120 seconds have elapsed after the restart of charging.

When the lithium ion secondary cell 100 is charged for 120 seconds with a constant current of 3 C (15 A), the electric quantity (0.5 Ah) corresponding to SOC 10% can be supplied to each of the lithium ion secondary cells 100. Thus, in the embodiment 17, in the second split charging period (120 seconds), the lithium ion secondary cell 100 with SOC of 40% can be charged so that the SOC is restored to 50%.

When it is determined in step V58 that the second split charging period has not elapsed (No), the processing is repeated until the second split charging period elapses.

Thereafter, when it is determined in step V58 that the second split charging period has elapsed (Yes), the flow proceeds to step V59, and charging of the lithium ion secondary cell 100 is suspended.

Subsequently, the flow proceeds to step V5A, and it is determined whether the charging suspension period has elapsed. Also in this case, the length of the charging suspension period is 30 seconds. Thus, it is determined whether 30 seconds have elapsed after the suspension of charging.

When it is determined in step V5A that the charging suspension period has not elapsed (No), the processing is repeated until the charging suspension period elapses. Thereafter, when it is determined in step V5A that the charging suspension period has elapsed (Yes), the flow proceeds to step V5B, and discharging of the lithium ion secondary cell 100 is started. Also in this case, discharging is performed with a constant current of 7.5 A.

Then, the flow proceeds to step V5C, whether the discharging period has elapsed is determined. As in the above case, the length of the discharging period is 1.0 second. Thus, it is determined whether 1.0 second has elapsed after the start of discharging.

When it is determined in step V5C that the discharging period has not elapsed (No), the processing is repeated until the discharging period elapses. Thereafter, when it is determined in step V5C that the discharging period has elapsed (Yes), the flow proceeds to step V5D, and charging of the lithium ion secondary cell 100 is started again.

Then, the flow proceeds to step V5E, and, as in step SA of the embodiment 1, it is determined whether the storage amount of the lithium ion secondary cell 100 has reached the second predetermined value (also in the embodiment 17, the storage amount corresponding to SOC 60%). Also in the embodiment 17, when the estimated SOC reaches 60%, it can be determined that the storage amount of the lithium ion secondary cell 100 has reached the second predetermined value.

In the embodiment 17, the lithium ion secondary cell 100 is charged with a constant current of 3 C (15 A) in the first, second, and third split charging periods. Thus, the length of the third split charging period is 120 seconds as in the first split charging period. The third split charging period corresponds to a period from when charging of the lithium ion secondary cell 100 with SOC restored to 50% is started again in step V5D till when the storage amount of the lithium ion secondary cell 100 reaches the second predetermined value (the storage amount corresponding to SOC 60%).

When it is determined in step V5E that the storage amount of the lithium ion secondary cell 100 has not reached the second predetermined value (No), the processing is repeated until the storage amount reaches the second predetermined value. Thereafter, when it is determined in step V5E that storage amount of the lithium ion secondary cell 100 has reached the second predetermined value (Yes), the flow returns to the main routine of FIG. 15, and charging is terminated.

It is to be noted that, in the embodiment 17, steps V51 to V5E correspond to the charging step.

(Cycle Test)

The lithium ion secondary cell 100 is charged from the first predetermined value (the storage amount corresponding to SOC 30%) to the second predetermined value (the storage amount corresponding to SOC 60%) and thereafter discharged to be lowered to the first predetermined value. This charging and discharging cycle is determined as 1 cycle, and a cycle test is performed. The cycle test will be described hereinafter in detail.

First, a cycle test according to the embodiment 15 will be described. The lithium ion secondary cell 100 with the storage amount corresponding to SOC 30% is prepared. The lithium ion secondary cell 100 is charged under the temperature environment of −15° C. until the SOC is restored to 60% (steps U51 to U5A) as described above. Thereafter, the lithium ion secondary cell 100 is discharged with a constant current of 20 A (4 C), whereby the storage amount of the lithium ion secondary cell 100 is lowered so as to correspond to SOC 30%. The charging and discharging cycle was determined as 1 cycle and repeated for 1124 cycles.

At that time, the discharge capacities in each of the cycles 101, 295, 496, 708, 915, and 1124 were measured and the percentages of each of the discharge capacities relative to the initial capacity were calculated as the capacity maintenance ratio (%). The capacity maintenance ratios in each of the cycles 101, 295, 496, 708, 915, and 1124 were 99.54%, 99.01%, 98.61%, 98.14%, 97.23% and 96.04%, respectively. This result as the relation between the number of charging and discharging cycles and the capacity maintenance ratio is indicated by the chain line and black triangles in FIG. 17.

Next, a cycle test according to the embodiment 16 will be described. The embodiment 16 is different from the embodiment 15 in that the lithium ion secondary cell 100 was charged under such a changed condition that the length of the discharging period was 1.0 second (steps U51 to U5A). Other conditions were the same as those in the embodiment 15, and the charging and discharging cycle was repeated for 1097 cycles. At that time, the discharge capacities in each of the cycles 101, 294, 496, 704, 913, and 1097 were measured and the percentages of each of the discharge capacities relative to the initial capacity were calculated as the capacity maintenance ratio (%). The capacity maintenance ratios in each of the cycles 101, 294, 496, 704, 913, and 1097 were 99.34%, 99.03%, 98.83%, 98.41%, 97.78% and 97.13%, respectively. This result is indicated by the chain double-dashed line and black diamond shapes in FIG. 17.

Next, a cycle test according to the embodiment 17 will be described. The embodiment 17 is different from the embodiment 15 in that the processing from steps V51 to V5E was performed, and the lithium ion secondary cell 100 was charged. Other conditions were the same as those in the embodiment 15, and the charging and discharging cycle was repeated for 1068 cycles.

At that time, the discharge capacities in each of the cycles 80, 238, 401, 568, 733, 903, and 1068 were measured and the percentages of each of the discharge capacities relative to the initial capacity were calculated as the capacity maintenance ratio (%). The capacity maintenance ratios in each of the cycles 80, 238, 401, 568, 733, 903, and 1068 were 99.86%, 99.83%, 99.52%, 99.35%, 98.98%, 98.76%, and 98.28%, respectively. This result is indicated by the solid line and white squares in FIG. 17.

For comparison with the embodiments 15 to 17, the cycle test according to the comparison 6 was performed. The comparison 6 was different from the embodiments 15 to 17 in that charging was continuously performed without splitting the charging period. Specifically, the lithium ion secondary cell 100 was continuously charged with a constant current of 15 A (3 C) for 360 seconds, whereby the storage amount of the lithium ion secondary cell 100 was restored to the storage amount corresponding to SOC 60%. Thereafter, the lithium ion secondary cell 100 was discharged with a constant current of 20 A (4 C), whereby the storage amount of the lithium ion secondary cell 100 was lowered so as to correspond to SOC 30%. This charging and discharging cycle was determined as 1 cycle and repeated for 1134 cycles. At that time, the discharge capacities in each of the cycles 103, 298, 500, 713, 921, and 1134 were measured and the percentages of each of the discharge capacities relative to the initial capacity were calculated as the capacity maintenance ratio (%). The capacity maintenance ratios in each of the cycles 103, 298, 500, 713, 921, and 1134 were 99.44%, 98.88%, 98.42%, 97.58%, 96.43%, and 95.27%, respectively. This result is indicated by the dashed line and black circles in FIG. 8.

Figure 17:
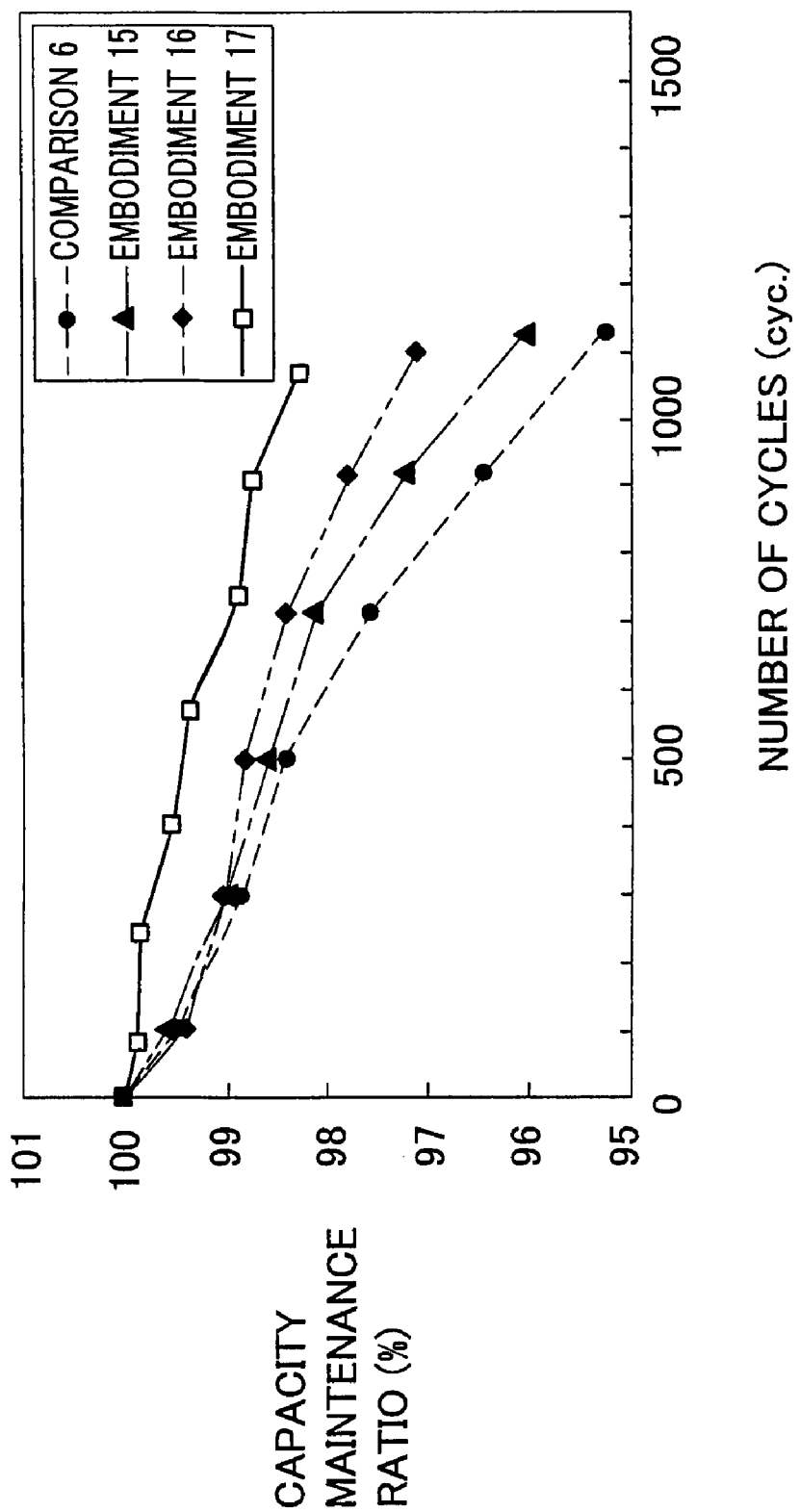
FIG. 17 is a graph showing a cycle test result according to the embodiments 15 to 17 and a comparison 6.

As shown in FIG. 17, in the embodiments 15 and 16, the reduction of the capacity maintenance ratio caused by the cycle test (the repetition of charging and discharging) was smaller than that in the comparison 6. This is because, in the embodiments 15 and 16, the charging period from the first predetermined value to the second predetermined value was split into three split charging periods and the charging suspension periods (non-charging periods) provided between the split charging periods. It can be considered that charging was suspended in the middle of the charging period, whereby Li ions retained on the interface between the electrolytic solution and the negative electrode due to the diffusion control was diffused in the lithium ion secondary cell 100. It can be said that the reduction of the electrical capacity caused by the deposition of metal Li was suppressed with this configuration.

Further, also in the embodiment 17, the reduction of the capacity maintenance ratio caused by the cycle test (the repetition of charging and discharging) is smaller than that in the comparison 6. This is because, in the embodiment 17, the charging period from the first predetermined value to the second predetermined value is split into three split charging periods and the non-charging periods (the charging suspension period and the discharging period) provided between the split charging periods. It is considered that suspension and discharging are performed during the charging period, whereby Li ions, retained on the interface between the electrolytic solution and the negative electrode due to the diffusion control, can be diffused in the lithium ion secondary cell 100. It can be said that the reduction of the electrical capacity caused by the deposition of metal Li was suppressed with this configuration.

Further, when the results of the embodiments 15 and 16 are compared with each other, the reduction of the capacity maintenance ratio in the embodiment 16 is smaller than that in the embodiment 15. It is considered that this is because the discharging period in the embodiment 16 is longer than that in the embodiment 15. This result shows that the longer the discharging period is, the greater the effect of suppressing the reduction of the electrical capacity caused by the deposition of metal Li is.

When the results of the embodiments 16 and 17 are compared with each other, the reduction of the capacity maintenance ratio in the embodiment 17 is further smaller than that in the embodiment 16. It is considered that this is because, in the embodiment 17, discharging similar to the embodiment 16 is performed in the non-charging period and at the same time, the charging suspension period is provided in the non-charging period. This result shows that suspension of charging and discharging are performed in each non-charging period, whereby the effect of suppressing the reduction of the electrical capacity caused by the deposition of metal Li can be further enhanced compared with the case where only discharging is performed.

(Variation 1)

Next, a method for charging a lithium ion secondary cell according to the variation 1 will be described.

Figure 7:
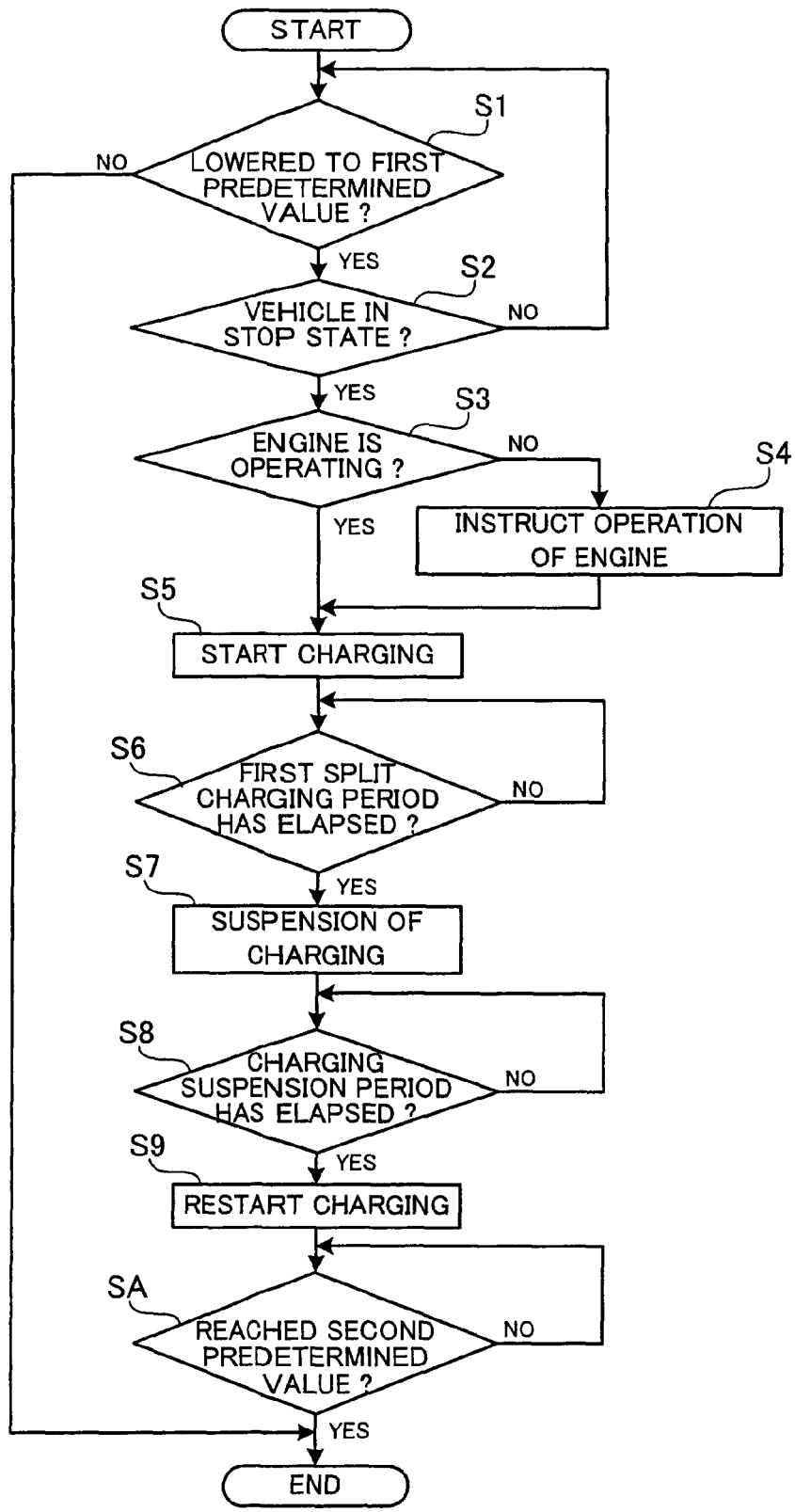
FIG. 7 is a flow chart showing a flow of charging method for charging the lithium ion secondary cell in the embodiment 1.

In the embodiment 1, in step S6, it is determined whether the first split charging period has elapsed (see FIG. 7). Specifically, the length tc of the first split charging period KC1 is set to 67.5 seconds, and it is determined whether 67.5 seconds have elapsed after the start of charging in step S5.

Figure 14:
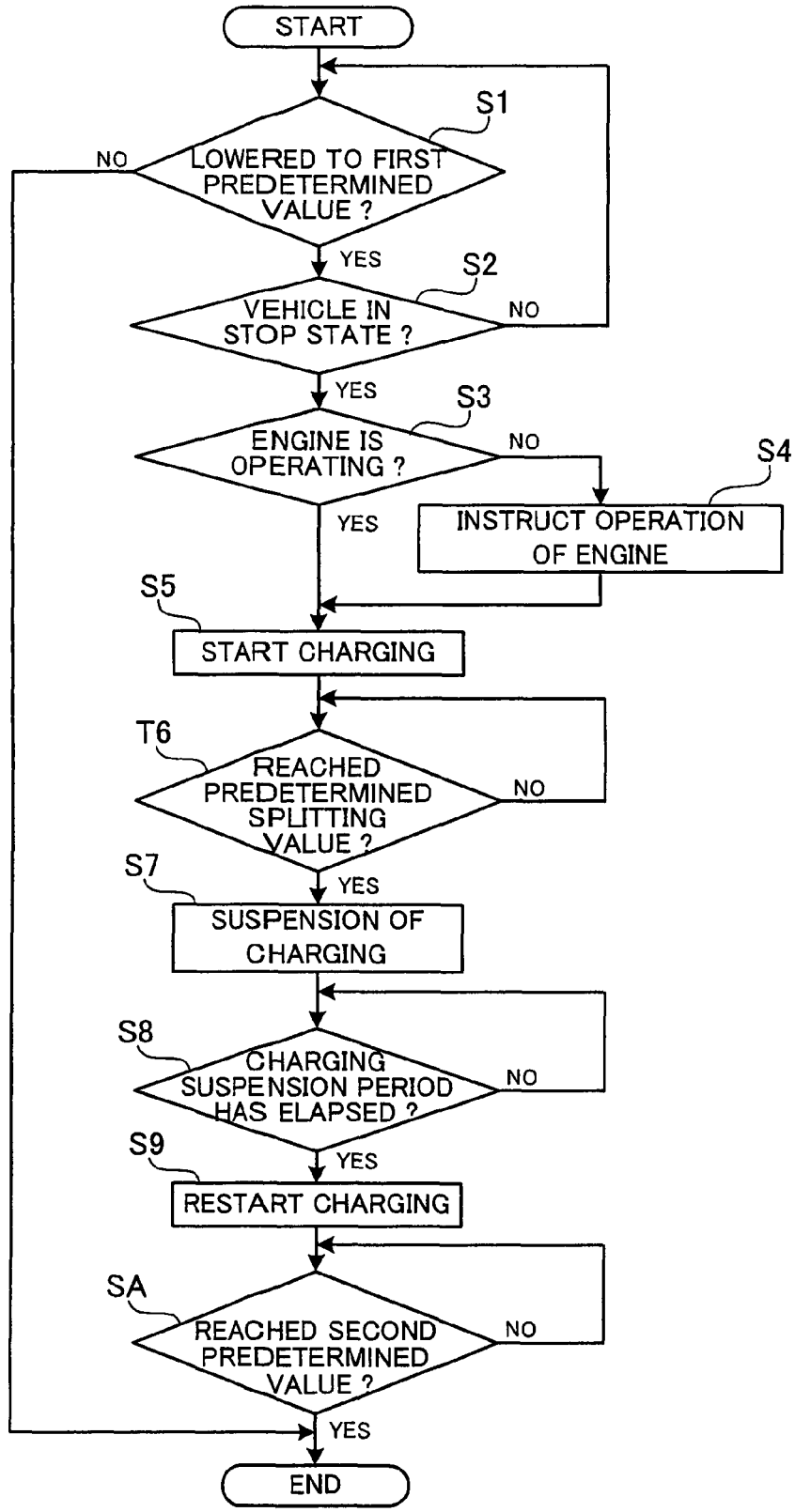
FIG. 14 is a flow chart showing a flow of charging method for charging the lithium ion secondary cell according to a variation 1.

Meanwhile, in the variation 1, as shown in FIG. 14, step T6 is provided instead of step S6, and it is determined whether the storage amount of the lithium ion secondary cell 100 has reached a predetermined splitting value. Specifically, the predetermined splitting value is set to the storage amount corresponding to SOC 45% which is an intermediate value between the first predetermined value (the storage amount corresponding to SOC 30%) and the second predetermined value (the storage amount corresponding to SOC 60%). When the estimated SOC, estimated by the cell controller 30, has reached 45%, it can be determined that the storage amount of the lithium ion secondary cell 100 has reached the predetermined splitting value. When it is determined that the storage amount of the lithium ion secondary cell 100 has reached the predetermined splitting value in step T6, charging is suspended in step S7. Thereafter, as in the embodiment 1, the processing from steps S8 to SA is performed so that the storage amount of the lithium ion secondary cell 100 is restored to the second predetermined value.

Also in the above method for charging, the charging period during which charging is performed until the storage amount lowered to the first predetermined value reaches the second predetermined value is split into two split charging periods and the non-charging period (charging suspension period) provided between the split charging periods, and charging can be performed in the split charging period and charging can be suspended in the non-charging period. In this way charging is suspended in the course of the charging period, whereby Li ions, retained on the interface between the electrolytic solution and the negative electrode due to the diffusion control, can be diffused in the lithium ion secondary cell 100, and therefore, the deposition of metal Li on the negative electrode surface is suppressed. This configuration can suppress the reduction of the electrical capacity caused by the deposition of metal Li.

Further, also in the method for charging in the variation 1, as in the embodiment 1, the length tc of each split charging period can be increased to not less than 40 seconds. Specifically, in each split charging period (the first split charging period KC1 and the second split charging period KC2), the electric capacity (0.75 Ah) corresponding to SOC 15% is supplied to the lithium ion secondary cell 100 with a constant current of 8 C (40 A). Thus, the length tc of each split charging period is 67.5 seconds. When a single split charging period is long, the idling of the hybrid electric vehicle 1 can be stabilized even during the charging period, and therefore, the comfort of riding the hybrid electric vehicle is not lost.

Although the present invention has been described based on the embodiments 1 to 17 and the variation 1, it is not limited to the above embodiments and variation. Needless to say, it can be appropriately modified and applied without departing from the scope of the present invention.

For example, in the above embodiments, the storage amount of the lithium ion secondary cell 100 is used as the first and second predetermined values and the predetermined splitting value; however, the voltage V between terminals of the lithium ion secondary cell 100 may be used.

Specifically, in step S1 of FIGS. 7, 14, and 15, it may be determined whether the voltage V between terminals of the lithium ion secondary cell 100 has lowered to the first predetermined value (a voltage value V1 between terminals which corresponds to the storage amount corresponding to SOC 30%). Specifically, as the first predetermined value, the voltage value V1 between terminals when the storage amount of the lithium ion secondary cell 100 corresponds to SOC 30% is stored in the ROM 31 of the cell controller 30 based on a previously obtained "storage amount-voltage correlation map" showing a correspondence relationship between a value of the storage amount of the lithium ion secondary cell 100 and a value of the voltage V between terminals. According to this configuration, when the voltage detector 40 detects the voltage value V1 between terminals, the cell controller 30 can determine that the voltage V between terminals of the lithium ion secondary cell 100 has lowered to the first predetermined value.

Figure 16:
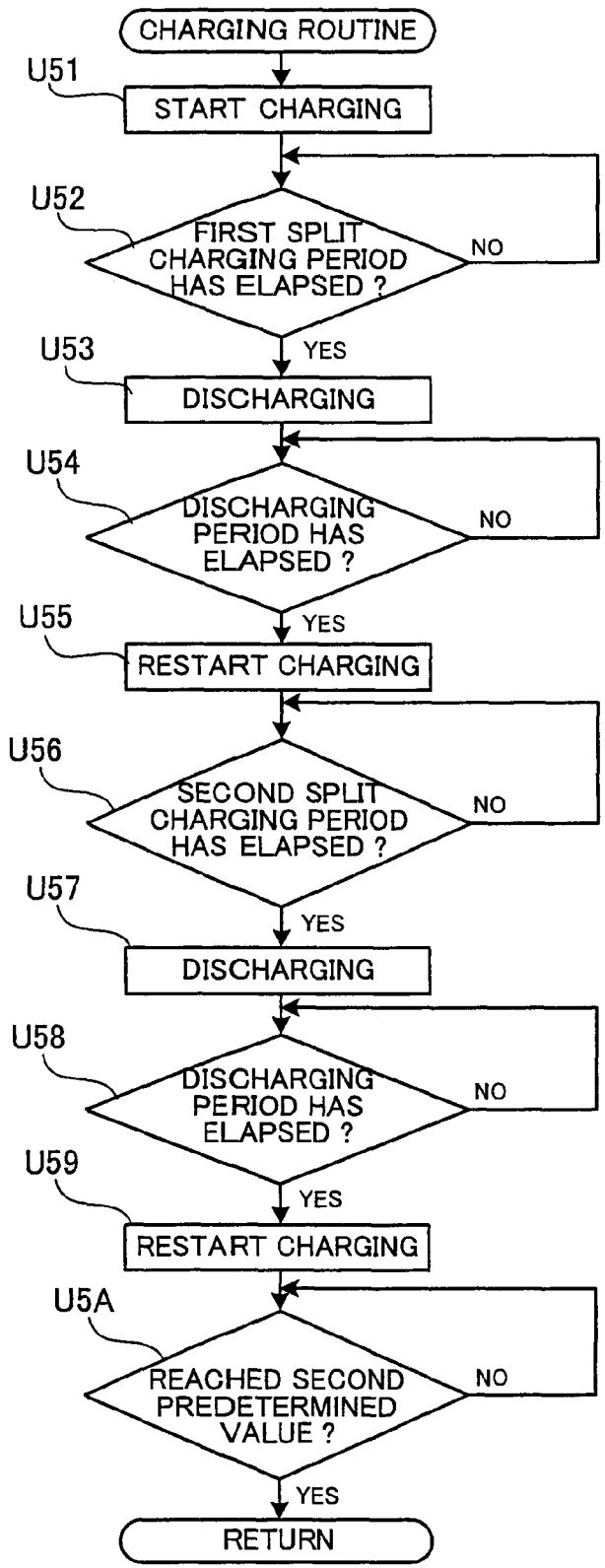
FIG. 16 is a flow chart of charging steps according to the embodiment 15.
Figure 18:
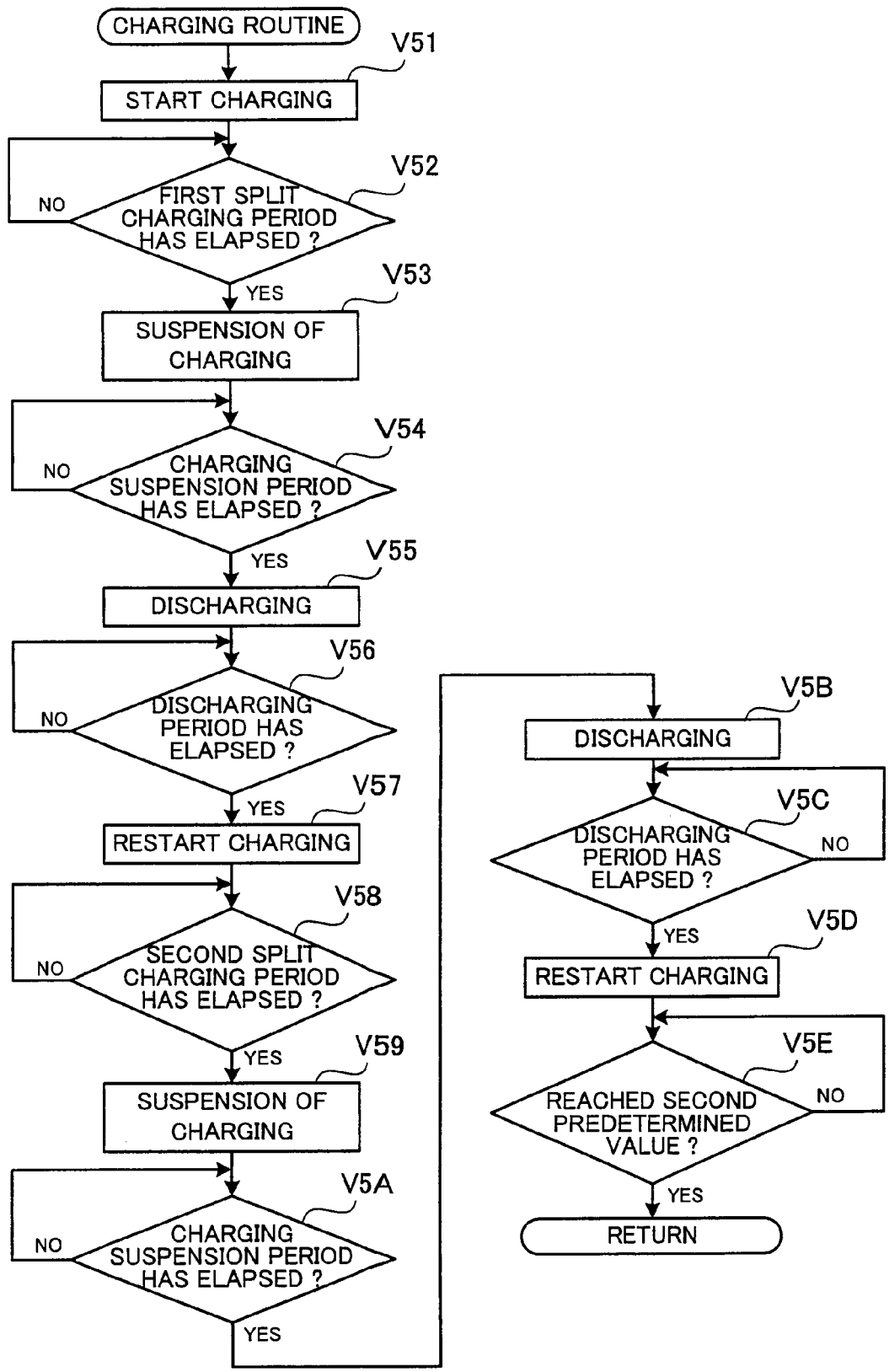
FIG. 18 is a flow chart of charging steps according to the embodiment 17.

Likewise, in step SA of FIGS. 7 and 14 and steps U5A and V5E of FIGS. 16 and 18, it may be determined whether the voltage V between terminals of the lithium ion secondary cell 100 has reached the second predetermined value (a voltage value V2 between terminals when the storage amount of the lithium ion secondary cell 100 corresponds to SOC 60%). Also, in step T6 of FIG. 14, it may be determined whether the voltage V between terminals of the lithium ion secondary cell 100 has reached the predetermined splitting value (a voltage value V3 between terminals when the storage amount of the lithium ion secondary cell 100 corresponds to SOC 45%).

In the method for charging of the embodiment 1, whether the storage amount of the lithium ion secondary cell 100 has reached the second predetermined value is determined in step SA (see, FIG. 7). Alternately, it may be determined whether the second split charging period KC2 has elapsed. Namely, the length tc of the second split charging period KC2 is set to 67.5 seconds, whereby it may be determined whether 67.5 seconds have elapsed after the restart of charging in step S9.

Further, in the method for charging of the embodiment 1, in the first and second split charging periods KC1 and KC2, an equivalent constant current (specifically, 40 A) is supplied to the lithium ion secondary cell 100. However, the lithium ion secondary cell 100 may be charged with a constant current in such a manner that the current values are differentiated between the first and second split charging periods KC1 and KC2. Alternatively, the cell temperature of the lithium ion secondary cell 100 is detected, whereby the lithium ion secondary cell 100 may be charged so that the current value is fluctuated according to the fluctuation of the cell temperature.

In the embodiments 15 and 17, whether the first split charging period has elapsed is determined in steps U52 and V52 (see FIGS. 16 and 18). Specifically, the length of the first split charging period is set to 120 seconds, and whether 120 seconds have elapsed after the start of charging is determined in steps U52 and V52.

However, it may be determined whether the storage amount of the lithium ion secondary cell 100 has reached the first predetermined splitting value in steps U52 and V52. Specifically, the first predetermined splitting value is set to the storage amount corresponding to SOC 40%. When the estimated SOC estimated by the cell controller 30 has reached 40%, it can be determined that the storage amount of the lithium ion secondary cell 100 has reached the predetermined splitting value. Thus, when it is determined that the storage amount of the lithium ion secondary cell 100 has reached the first predetermined splitting value, the flow may proceed to steps U53 and V53, respectively.

Further, it may be determined whether the storage amount of the lithium ion secondary cell 100 has reached a second predetermined splitting value in steps U56 and V58. Specifically, the second predetermined splitting value is set to the storage amount corresponding to SOC 50%. When the estimated SOC estimated by the cell controller 30 reaches 50%, it can be determined that the storage amount of the lithium ion secondary cell 100 has reached the predetermined splitting value. Thus, when it is determined that the storage amount of the lithium ion secondary cell 100 has reached the second predetermined splitting value, the flow may proceed to steps U57 and V59, respectively.

In the embodiment 1 and the other embodiments, charging of the lithium ion secondary cell 100 is temporarily suspended in the non-charging period as the charging suspension period. Alternately, the lithium ion secondary cell 100 may be temporarily discharged in the non-charging period as the discharging period.

The cycle tests according to reference examples 1 to 4 will be described.

First, the cycle test according to the reference example 1 will be described. The lithium ion secondary cell 100 is charged with a constant current of 80 A (16 C) under the temperature environment of 0° C. until the voltage reaches 4.3 V as the final voltage, and thereafter charged at a constant voltage of 4.3 V, whereby the lithium ion secondary cell 100 is charged so that the SOC reaches approximately 100%. Thereafter, the processing is suspended for 180 seconds. Then, the lithium ion secondary cell 100 is discharged with a constant current of 1 A until the voltage reaches 3.726 V as the final voltage, and thereafter discharged at a constant voltage of 3.726 V, whereby the lithium ion secondary cell 100 is regulated so that the SOC reaches approximately 60%. Thereafter, the processing is suspended for 420 seconds. Such a charging and discharging cycle is determined as 1 cycle and repeated for 3092 cycles.

At that time, the discharge capacities in each of the cycles 200, 482, 861, 1389, 2049, 2702, and 3092 were measured and the percentages of each of the discharge capacities relative to the initial capacity were calculated as the capacity maintenance ratio (%). The capacity maintenance ratios in each of the cycles 200, 482, 861, 1389, 2049, 2702, and 3092 were 99.69%, 99.08%, 98.26%, 97.15%, 95.07%, 92.52%, and 91.63%, respectively. This result is indicated by the dashed line and black circles in FIG. 19.

Next, a cycle test according to the reference example 2 will be described. The reference example 2 is different from the reference example 1 only in that discharging was performed with a constant current of 5 A for one second before each charging and discharging cycle, and other conditions in the reference example 2 were the same as those in the reference example 1. At that time, the discharge capacities in each of the cycles 650, 1412, 2166, 2528, and 2944 were measured and the percentages of each of the discharge capacities relative to the initial capacity were calculated as the capacity maintenance ratio (%). The capacity maintenance ratios in each of the cycles 650, 1412, 2166, 2528, and 2944 were 99.4%, 99.9%, 97.7%, 96.6%, and 94.8%, respectively. This result is indicated by the chain line and black triangles in FIG. 19.

Next, a cycle test according to the reference example 3 will be described. The reference example 3 is different from the reference example 1 only in that discharging was performed with a constant current of 40 A for one second before each charging and discharging cycle, and other conditions in the reference example 3 were the same as those in the reference example 1. At that time, the discharge capacities in each of the cycles 651, 1416, 2172, 2535, and 2951 were measured and the percentages of each of the discharge capacities relative to the initial capacity were calculated as the capacity maintenance ratio (%). The capacity maintenance ratios in each of the cycles 651, 1416, 2172, 2535, and 2951 were 99.4%, 98.8%, 98.1%, 97.4%, and 96.7%, respectively. This result is indicated by the solid line and white squares in FIG. 19.

Next, a cycle test according to the reference example 4 will be described. The reference example 4 is different from the reference example 1 only in that discharging was performed with a constant current of 40 A for 5 seconds before each charging and discharging cycle, and other conditions in the reference example 4 were the same as those in the reference example 1. At that time, the discharge capacities in each of the cycles 641, 1395, 2140, 2497, and 2905 were measured and the percentages of each of the discharge capacities relative to the initial capacity were calculated as the capacity maintenance ratio (%). The capacity maintenance ratios in each of the cycles 641, 1395, 2140, 2497, and 2905 were 99.7%, 99.3%, 98.6%, 98.5%, and 98.4%, respectively. This result is indicated by the chain double-dashed line and black diamonds in FIG. 19.

Figure 19:
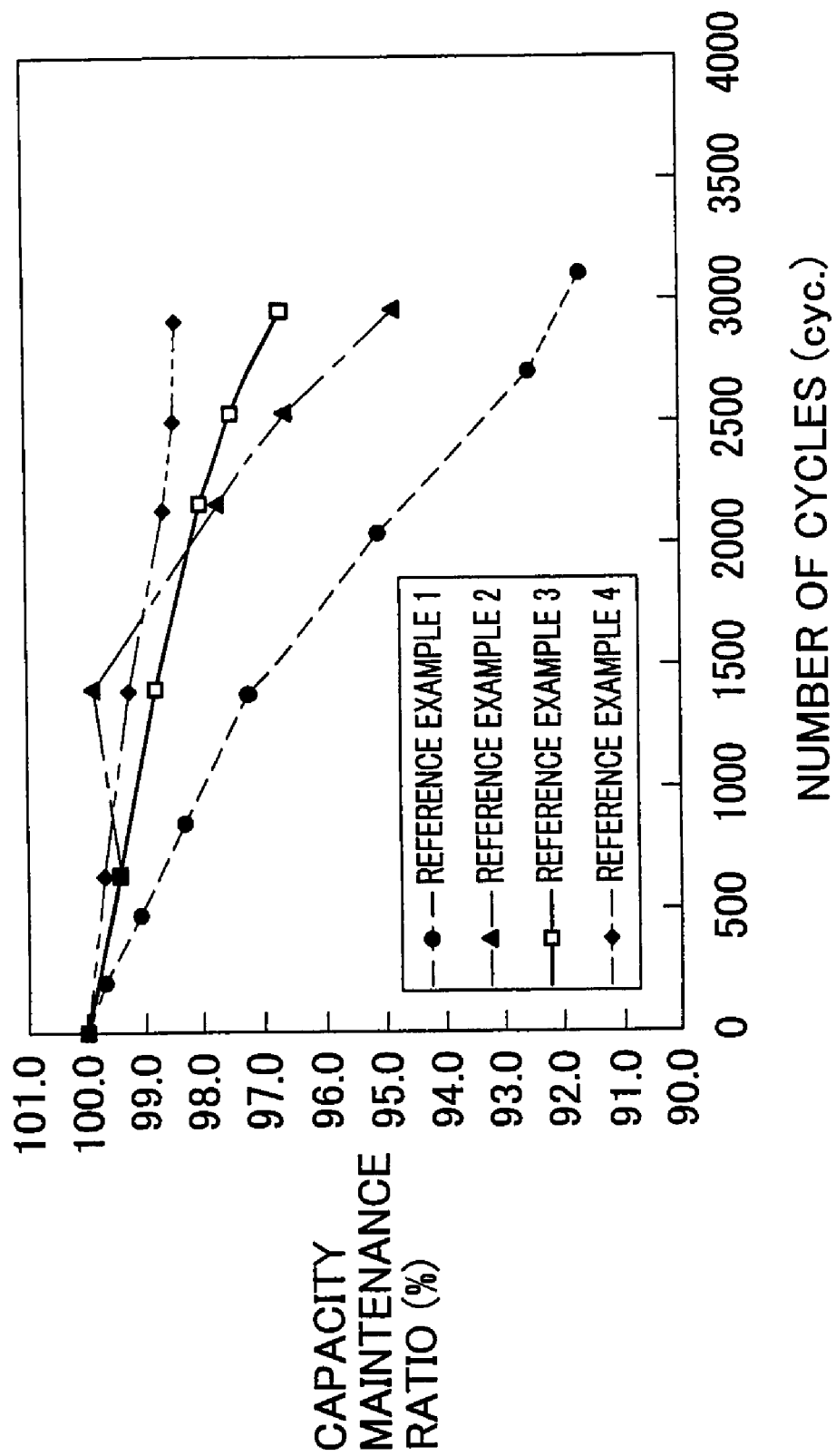
FIG. 19 is a graph showing a cycle test result according to reference examples 1 to 4.

As shown in FIG. 19, in the reference examples 2 to 4, the reduction of the capacity maintenance ratio caused by the cycle test (the repetition of charging and discharging) was smaller than that in the reference example 1. The reason is considered that, in the reference examples 2 to 4, discharging is performed before each charging and discharging cycle, whereby Li ions, retained on the interface between the electrolytic solution and the negative electrode due to the diffusion control can be diffused.

This result shows that in the method for charging of the present invention, the lithium ion secondary cell 100 is discharged during the non-charging period, whereby the deposition of metal Li on the negative electrode surface is suppressed, so that the reduction of the electrical capacity can be suppressed.

In the embodiment 1, the length tr of the charging suspension period is 30 seconds. Meanwhile, in the reference examples 2 and 3, although the discharging period was only 1 second, it was possible to significantly enhance the capacity maintenance ratio relative to the reference example 1. Based on this fact, it is considered that in the method for charging of the present invention, when the non-charging period is the discharging period, compared with the case where the non-charging period is the charging suspension period, the non-charging period can be substantially shortened and furthermore, the reduction of the electrical capacity can be further suppressed. Thus, it is considered that by performing discharging in the non-charging period, while the reduction of the electrical capacity can be suppressed, the lithium ion secondary cell 100 with the storage amount lowered to the first predetermined value can be rapidly charged so that the storage amount is restored to the second predetermined value.

The invention claimed is:

1. A method for charging a lithium ion secondary cell, which is used as a power source for driving and mounted in a hybrid electric vehicle, the method comprising the steps of:
   determining whether a value of a physical quantity corresponding to a storage amount of the lithium ion secondary cell has lowered to a first predetermined value;
   determining whether the hybrid electric vehicle is in a travel stop state; and
   when it is determined that the value of the physical quantity corresponding to the storage amount of the lithium ion secondary cell has lowered to the first predetermined value and in addition when it is determined that the hybrid electric vehicle is in the travel stop state, charging the lithium ion secondary cell until the value of the physical quantity corresponding to the storage amount of the lithium ion secondary cell reaches a second predetermined value while the hybrid electric vehicle stops running,
   wherein in the step of charging, a period during which the lithium ion secondary cell is charged is split into two or more split charging periods and non-charging periods provided between the split charging periods, and charging is performed in the split charging period and at least one of suspension of charging and discharging is performed in the non-charging period, and
   the length of each of the split charging periods is not less than 40 seconds.

2. The method for charging a lithium ion secondary cell according to claim 1, wherein the non-charging period is a charging suspension period during which charging of the lithium ion secondary cell is suspended, and
   a ratio tr/tc between the length tc of each of the split charging periods and the length tr of the charging suspension period immediately after the split charging period is not less than 0.14 and not more than 0.9.

3. The method for charging a lithium ion secondary cell according to claim 1, wherein the non-charging period is a discharging period during which the lithium ion secondary cell is discharged.

4. The method for charging a lithium ion secondary cell according to claim 1, wherein each of the non-charging periods is a charging suspension period during which charging of the lithium ion secondary cell is suspended and a discharging period during which the lithium ion secondary cell is discharged.

5. The method for charging a lithium ion secondary cell according to claim 1, further comprising the steps of:
   determining whether an engine mounted in the hybrid electric vehicle is in an operating state; and
   instructing start of the operation of the engine when it is determined that the engine is not operating,
   wherein in the step of charging, in such a state that a generator mounted in the hybrid electric vehicle is being driven by the operation of the engine, an electric power generated by the generator is supplied to the lithium ion secondary cell to charge the lithium ion secondary cell.

6. The method for charging a lithium ion secondary cell according to claim 1, wherein, defining 1 C as a current value allowing a theoretical electrical capacity to be charged for 1 hour, that can be theoretically stored at maximum in a positive-electrode active material contained in the lithium ion secondary cell, the lithium ion secondary cell is charged with a current having a magnitude of not less than 2 C in the step of charging.

7. A hybrid electric vehicle, comprising:
   a lithium ion secondary cell which is used as a power source for driving and mounted in the hybrid electric vehicle;
   a first determination device which determines whether a value of a physical quantity corresponding to a storage amount of the lithium ion secondary cell has lowered to a first predetermined value;
   a stop state determination device which determines whether the hybrid electric vehicle is in a travel stop state; and
   a charging control device which, when it is determined that the value of the physical quantity corresponding to the storage amount of the lithium ion secondary cell has lowered to the first predetermined value and in addition when it is determined that the hybrid electric vehicle is in the travel stop state, controls charging of the lithium ion secondary cell until the value of the physical quantity corresponding to the storage amount of the lithium ion secondary cell reaches a second predetermined value while the hybrid electric vehicle stops running, wherein the charging control device splits a period during which the lithium ion secondary cell is charged into two or more split charging periods and non-charging periods provided between the split charging periods, and performs charging in the split charging period and performs at least one of suspension of charging and discharging in the non-charging period, and the length of each of the split charging periods is not less than 40 seconds.

8. The hybrid electric vehicle according to claim 7, wherein the charging control device is configured so that the non-charging period is a charging suspension period during which charging of the lithium ion secondary cell is suspended and that a ratio tr/tc between the length tc of each of the split charging periods and the length tr of the charging suspension period immediately after the split charging period is not less than 0.14 and not more than 0.9, the charging control device controls charging of the lithium ion secondary cell.

9. The hybrid electric vehicle according to claim 7, wherein the charging control device is configured so that the non-charging period is a discharging period during which the lithium ion secondary cell is discharged.

10. The hybrid electric vehicle according to claim 7, wherein the charging control device is configured so that each of the non-charging periods is a charging suspension period during which charging of the lithium ion secondary cell is suspended and a discharging period during which the lithium ion secondary cell is discharged.

11. The hybrid electric vehicle according to claim 7, further comprising:

an engine operation determination device which determines whether an engine mounted in the hybrid electric vehicle is operating; and an engine operation instruction device which instructs start of the operation of the engine when it is determined that the engine is not operating, wherein the charging control device performs control so that, in such a state that a generator mounted in the hybrid electric vehicle is being driven by the operation of the engine, an electric power generated by the generator is supplied to the lithium ion secondary cell to charge the lithium ion secondary cell.

12. The hybrid electric vehicle according to claim 7, wherein, defining 1 C as a current value allowing a theoretical electrical capacity to be charged for 1 hour, that can be theoretically stored at maximum in a positive-electrode active material contained in the lithium ion secondary cell, the charging control device performs control so that the lithium ion secondary cell is charged with a current having a magnitude of not less than 2 C.

* * * * *